(12) United States Patent
Woo et al.

(10) Patent No.: US 12,212,044 B2
(45) Date of Patent: Jan. 28, 2025

(54) ELECTRONIC DEVICE EQUIPPED WITH ANTENNA MODULE

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 18/002,957

(22) PCT Filed: Jul. 22, 2020

(86) PCT No.: PCT/KR2020/009638
§ 371 (c)(1),
(2) Date: Dec. 22, 2022

(87) PCT Pub. No.: WO2022/019351
PCT Pub. Date: Jan. 27, 2022

(65) Prior Publication Data
US 2023/0246326 A1 Aug. 3, 2023

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/48* (2013.01); *H01Q 3/36* (2013.01); *H01Q 9/0407* (2013.01); *H01Q 9/28* (2013.01)

(58) Field of Classification Search
CPC ............ H01Q 1/24; H01Q 1/243; H01Q 1/38; H01Q 1/48; H01Q 1/52; H01Q 1/523;
(Continued)

(56) References Cited

U.S. PATENT DOCUMENTS 7,295,167 B2 * 11/2007 Aminzadeh .............. H01Q 5/40
343/846
7,936,306 B2 * 5/2011 Mierke .................. H01Q 21/28
343/711
(Continued)

FOREIGN PATENT DOCUMENTS

KR 1020110042001 4/2011
KR 101791129 10/2017
(Continued)

OTHER PUBLICATIONS

PCT International Application No. PCT/KR2020/009638, International Search Report dated Apr. 21, 2021, 2 pages.

*Primary Examiner* — Tho G Phan
(74) *Attorney, Agent, or Firm* — LEE, HONG, DEGERMAN, KANG & WAIMEY

(57) ABSTRACT

Provided is an electronic device having a multilayer substrate according to an embodiment. The electronic device may include a multilayer substrate on which an antenna is disposed and which includes a front layer, a back layer, a plurality of middle layers, and a plurality of ground layers. The antenna may include a lower patch that is disposed on a layer different from an upper ground among the plurality of ground layers and is electrically connected to the upper ground at a plurality of offset points; and an upper patch disposed spaced apart from the lower patch by a predetermined distance.

26 Claims, 25 Drawing Sheets

(51) Int. Cl.
*H01Q 1/48* (2006.01)
*H01Q 3/36* (2006.01)
*H01Q 9/04* (2006.01)
*H01Q 9/28* (2006.01)

(58) Field of Classification Search
CPC ............ H01Q 21/08; H01Q 3/36; H01Q 9/04; H01Q 9/0407; H01Q 9/0414; H01Q 9/28; H01Q 9/285; H01Q 1/46; H01Q 3/26
See application file for complete search history.

(56) References Cited

U.S. PATENT DOCUMENTS

| | | | |
|---|---|---|---|
| 9,680,232 B2 * | 6/2017 | Markish | H01Q 21/067 |
| 10,170,839 B2 * | 1/2019 | Xue | H01Q 9/0457 |
| 10,938,091 B1 * | 3/2021 | Cho | H01Q 1/243 |
| 11,050,154 B2 * | 6/2021 | Park | H01Q 21/065 |
| 11,134,298 B2 * | 9/2021 | Rajagopalan | H01Q 21/24 |
| 11,189,926 B2 * | 11/2021 | Hwang | H01Q 9/045 |

FOREIGN PATENT DOCUMENTS

| | | |
|---|---|---|
| KR | 1020190080711 | 7/2019 |
| KR | 102054200 | 1/2020 |
| KR | 1020200085892 | 7/2020 |

* cited by examiner (a)

(b)

(c)

(d)

[DIRECT FEEDING]

(a)

[COUPLED FEEDING]

(b)

(a)

(b)

(c)

(a)

(b)

(c)

(a)

(b)

(c)

(d)

(e)

(f)

(a)

(b)

ELECTRONIC DEVICE EQUIPPED WITH ANTENNA MODULE

CROSS-REFERENCE TO RELATED APPLICATION(S)

This application is the National Stage filing under 35 U.S.C. 371 of International Application No. PCT/KR2020/009638, filed on Jul. 22, 2020, the contents of which are all incorporated by reference herein in its entirety.

TECHNICAL FIELD

The present disclosure relates to an electronic device having an antenna module. More particularly, the preset disclosure relates to an electronic device having an antenna module operating in a millimeter wave band.

BACKGROUND ART

Electronic devices may be categorized into mobile/portable terminals and stationary terminals in terms of mobility. Also, electronic devices may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the near future, it is also expected that the electronic devices can provide various services, with commercialization of wireless communication systems that use 5G communication technologies. Meanwhile, some of LTE frequency bands may be allocated for 5G communication services.

In this regard, mobile terminals may be configured to provide 5G communication services in various frequency bands. Recently, attempts have been made to provide 5G communication services using a Sub-6 band that is a band of 6 GHz or less. In the future, however, it is also expected to provide 5G communication services by using a millimeter-wave (mmWave) band in addition to the Sub-6 band for a faster data rate.

A 28 GHz band, a 39 GHz band, or a 64 GHz band may be considered as a frequency band allocated for the 5G communication service in the mmWave band. In relation to this, it is important to reduce an electrical loss by a transmission line between a plurality of array antennas and a transceiver circuit in the mmWave band.

A circuit substrate on which the array antennas and the transceiver circuit are arranged may be implemented as a multilayer substrate to optimize performance of several parts and reduce a substrate size.

However, when an antenna element in the mmWave band is arranged on the multilayer substrate, there is a problem such that antenna radiation efficiency may be reduced. In addition, when an antenna element in the mmWave band is arranged on the multilayer substrate, there is a problem such that a loss in a feeding unit configured to feed the antenna element may increase.

DISCLOSURE OF INVENTION

Technical Problem

The present disclosure is directed to solving the aforementioned problems and other drawbacks. In addition, an aspect of the present disclosure is to provide an electronic device having a multilayer substrate having an optimized ground shape.

Another aspect of the present disclosure is to increase antenna radiation efficiency in a millimeter wave band.

Another aspect of the present disclosure is to enhance antenna characteristics on a multilayer substrate in a millimeter wave band and reduce a feeding loss.

Solution to Problem

To achieve these and other advantages and in accordance with the purpose of the present invention, as embodied and broadly described herein, there is provided an electronic device. The electronic device may include a multilayer substrate on which an antenna is disposed and which includes a front layer, a back layer, a plurality of middle layers, and a plurality of ground layers. The antenna may include a lower patch that is disposed on a layer different from an upper ground among the plurality of ground layers and is electrically connected to the upper ground at a plurality of offset points; and an upper patch disposed spaced apart from the lower patch by a predetermined distance.

In an embodiment, at the plurality of offset points offset at a center point of the lower patch, the lower patch may be connected to the upper ground through a ground via to provide graded ground layers.

In an embodiment, at the plurality of offset points offset at a center point of the lower patch, the lower patch may be electrically connected to the upper ground through a ground via in a first axis direction.

In an embodiment, at the plurality of offset points offset at a center point of the lower patch, the lower patch may be electrically connected to the upper ground through a ground via in a first axis direction and a second axis direction vertical to the first axis direction.

In an embodiment, the lower patch and the upper ground may be connected to each other through a plurality of ground vias arranged in an edge portion of the lower patch. A number of the plurality of grounds vias may be three or more, and the plurality of ground vias may be arranged in a triangular or rectangular arrangement structure.

In an embodiment, the multilayer substrate may include a feeding line arranged between the upper ground and a lower ground. The feeding line may penetrate through the upper ground to be electrically connected to the lower patch, and a ground area may be removed from a region in which the feeding line penetrates through the upper ground.

In an embodiment, the feeding line may penetrate through the lower patch to be electrically connected to a feeding pad arranged on a layer between the lower patch and the upper patch.

In an embodiment, the feeding line may penetrate through the lower patch to be electrically connected to the upper patch, and the lower patch may be connected to the lower ground through a ground via.

In an embodiment, the multilayer substrate may include a feeding line arranged between the upper ground and a lower ground, and the feeding line may penetrate through the lower patch corresponding to a region in which the lower patch is not disposed, to be electrically connected to a feeding pad arranged on a layer between the lower patch and the upper patch.

In an embodiment, the feeding line may be electrically connected to the feeding pad through a vertical via at a point apart from a center of the feeding pad by a predetermined distance.

In an embodiment, the feeding line connected to the feeding pad at a first point through a first vertical via may be connected to the upper patch at a second point through a second vertical via, and the lower patch may be connected to the lower ground through a ground via.

In an embodiment, the antenna further may include a second lower patch arranged on the lower patch and electrically connected to the lower patch at a plurality of offset points. In an embodiment, the feeding line may penetrate through the lower patch and the second lower patch to be electrically connected to a feeding pad disposed on a layer between the second lower patch and the upper patch or electrically connected to the upper patch.

In an embodiment, the lower patch may be disposed on an underlying layer below the upper ground, and the feeding line may penetrate through the lower patch disposed on the underlying layer to be electrically connected to the upper patch.

In an embodiment, with respect to the lower patch, two lower patches may be disposed on an underlying layer below the upper ground to partially overlap two edge regions of the upper patch, and the antenna may further include a second lower patch disposed on a same layer as that of the upper ground. In an embodiment, one end of the lower patch may be connected to the upper ground through a first ground via, and another end of the lower patch may be connected to the second lower patch via a second ground via.

In an embodiment, the feeding line may include a first feeding line disposed between the upper ground and the lower ground; and a second feeding line connected to the first feeding line through a vertical via and disposed on a layer below the first feeding line. The second feeding line may provide a partial graded ground region in a region including a region in which the first ground via and the second ground via are provided.

In an embodiment, the multilayer substrate may include a feeding line arranged between the upper ground and a lower ground, and the feeding line may penetrate through the lower ground corresponding to a region in which the lower patch is not disposed. A ground via connected to the upper ground may be disposed on all four edge regions of the lower patch.

In an embodiment, the ground via may be disposed in all of a central region, a left region, and a right region with respect to each of the four edge regions.

In an embodiment, the region in which the feeding line penetrates through the upper ground may overlap one edge line of the lower patch or be disposed inside the edge line, and the ground via may be disposed in all of a central region, a left region, and a right region with respect to each of three edge regions among the four edge regions, other than a region in which the edge line is provided.

In an embodiment, in a first edge region in which the edge line is provided, the ground via may be disposed in a left region and a right region with respect to a region in which the feeding line is connected to the lower patch.

In an embodiment, the region in which the feeding line penetrates through the upper ground may be disposed inside the edge line, and A ground via may be configured not to be disposed in a central region of the lower patch other than an edge region of the lower patch.

In an embodiment, a size of the upper patch may be smaller than a size of the lower patch, and an edge region in which a ground via is connected to the lower patch may be an internal region of the upper patch. The feeding line may penetrate through the lower patch to be electrically connected to the upper patch or a feeding pad arranged between the lower patch and the upper patch.

In an embodiment, a first center point of the lower patch is spaced apart from a second center point of the upper patch. The lower patch may be connected to a region of the upper ground through at least one ground via in a region between the first center point and the second center point.

In an embodiment, the antenna may be configured as an array antenna including a plurality of antenna elements, and further include dummy patterns provided on different layers to be arranged between the plurality of antenna elements constituting the array antenna, respectively. The dummy patterns may be provided to surround the lower patch and the upper patch.

In an embodiment, the electronic device may further include a transceiver circuitry arranged on the multilayer substrate and configured to transmit a signal to the antenna and receive a signal from the antenna; and a processor coupled to be operable with the transceiver circuitry and configured to control the transceiver circuitry. The processor may control the transceiver circuitry to perform beamforming by applying a phase variable signal to each of the plurality of antenna elements through the feeding line.

In an embodiment, the antenna may be configured as an array antenna including a plurality of dipole elements A ground region in a region adjacent to an end portion of the plurality of dipole elements may be provided as a graded ground in which a ground pattern is removed in correspondence with a predetermined length and a predetermined width compared to a ground region adjacent to a center portion of the plurality of dipole elements.

There is also provided an antenna module implemented as a multilayer substrate. The antenna module may include a lower patch disposed on a layer different from that of an upper ground, among a plurality of ground layers of the multilayer substrate including a front layer, a back layer, and a plurality of middle layers, and electrically connected to the upper round at a plurality of offset points; and an upper patch disposed spaced apart from the lower patch by a predetermined distance.

In an embodiment, at the plurality of offset points offset at a center point of the lower patch, the lower patch may be electrically connected to the upper ground through a ground via in a first axis direction and a second axis direction vertical to the first axis direction.

Advantageous Effects of Invention

According to at least one embodiment, antenna bandwidth characteristics may be enhanced using a stepped ground structure in a millimeter-wave (mmWave) band.

According to at least one embodiment, antenna radiation efficiency may be increased and communication coverage may be expanded using a stepped ground structure in a mmWave band.

According to at least one embodiment, a distance between an upper patch and a ground is increased due to a stepped ground, and thus, a surface wave may be reduced and antenna efficiency may be enhanced. Accordingly, when an antenna having a stepped ground structure is implemented as an array antenna, a side-lobe level may be reduced.

According to at least one embodiment, antenna radiation efficiency may be increased and a feeding loss may be reduced due to a stepped structure an optimized feeding structure.

According to at least one embodiment, antenna characteristics may be enhanced in an array antenna structure by applying a stepped structure an optimized feeding structure to each radiation element of an array antenna.

A further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

MODE FOR THE INVENTION

Figure 1:
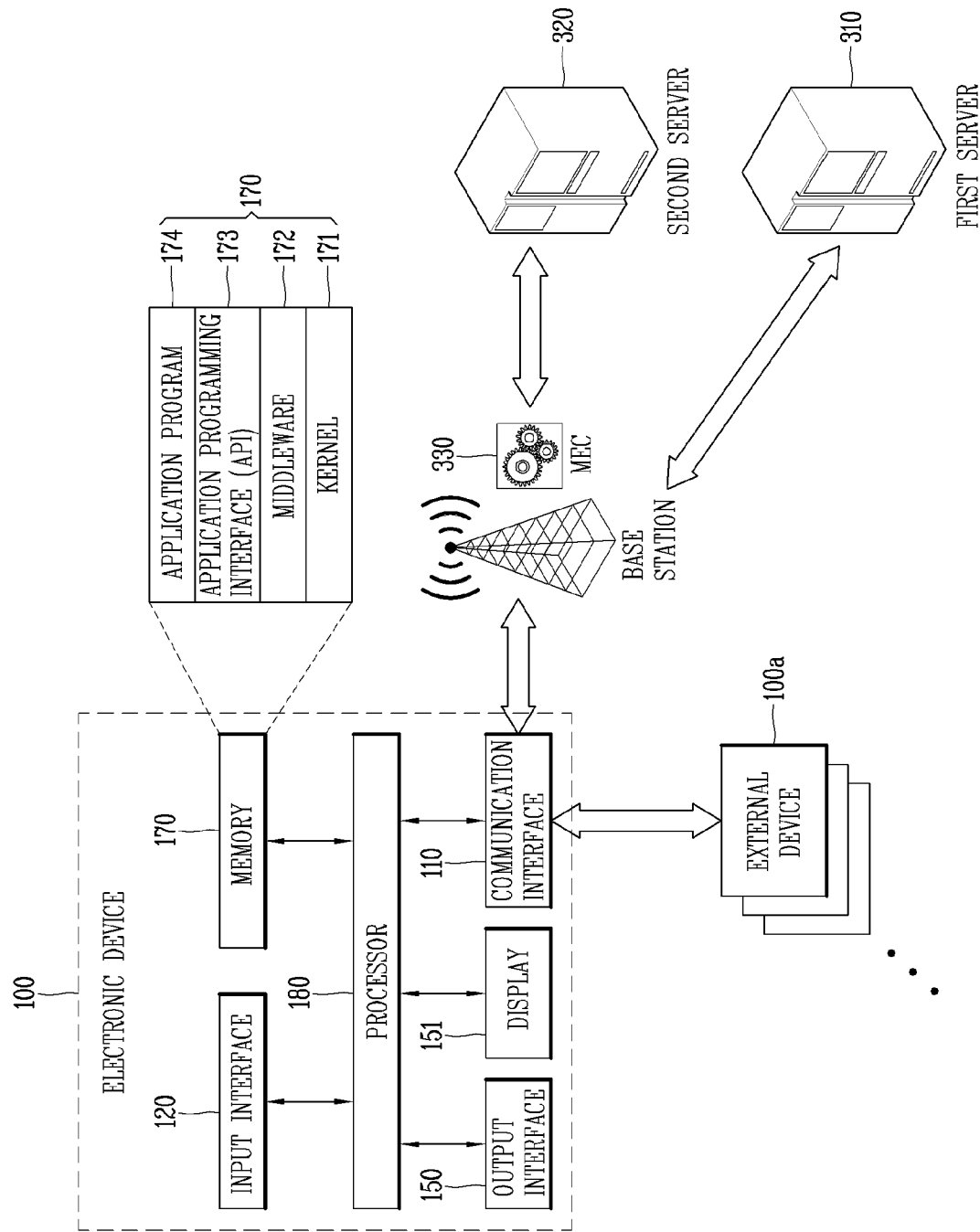
FIG. 1 is a block diagram for explaining an electronic device related to the present disclosure.

Regardless of reference numerals, the same or like components are assigned the same reference numerals, and redundant descriptions thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 2A:
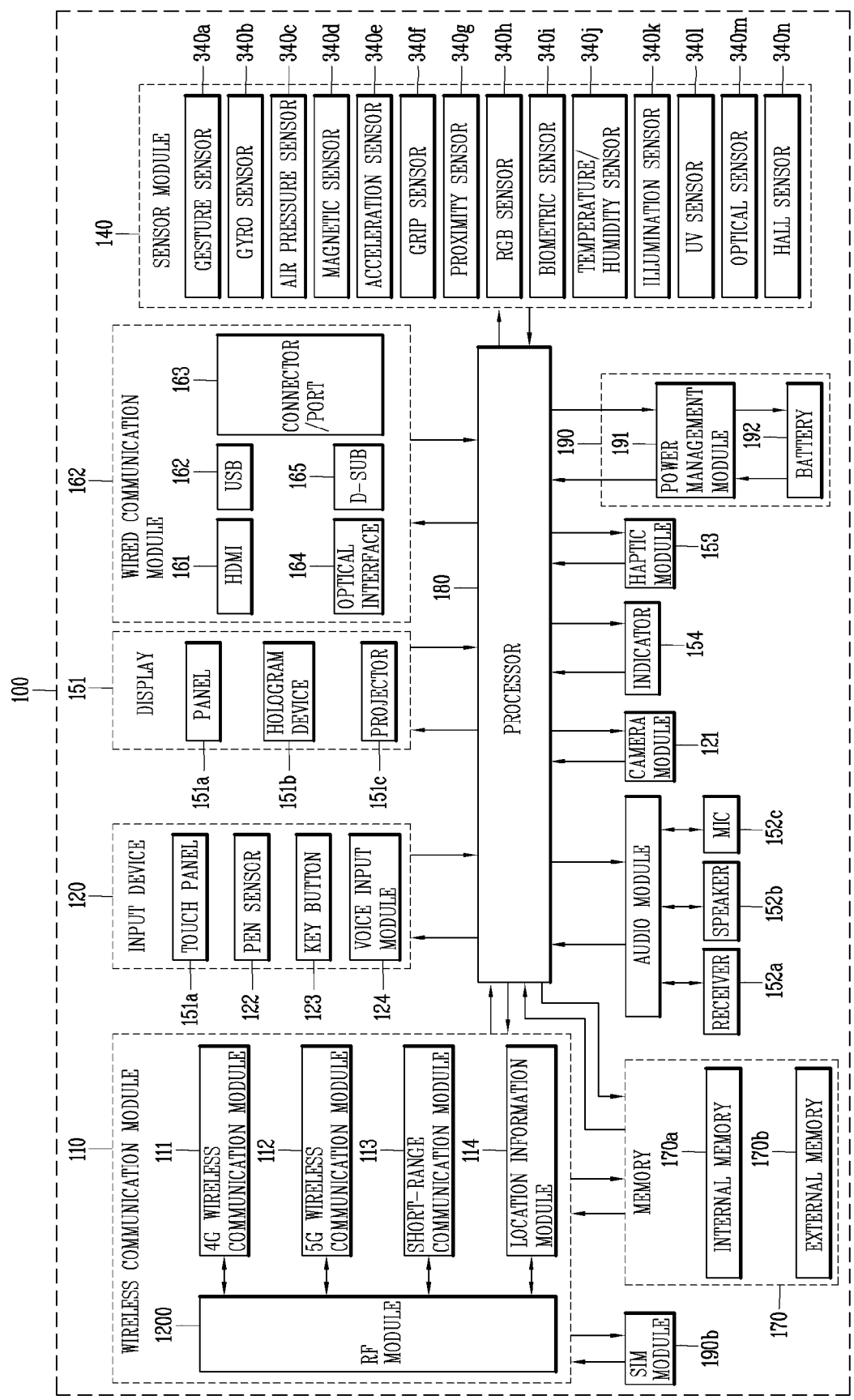
FIG. 2A illustrates a detailed configuration of the electronic device of FIG. 1.

FIG. 1 is a view illustrating a configuration for describing an electronic device in accordance with one embodiment, and an interface between the electronic device and an external device or server. FIG. 2A is a view illustrating a detailed configuration of the electronic device of FIG. 1A.

Referring to FIG. 1, the electronic device 100 may include a communication interface 110, an input interface (or input device) 120, an output interface (or output device) 150, and a processor 180. Here, the communication interface 110 may refer to a wireless communication module 110. Also, the electronic device 100 may be configured to further include a display 151 and a memory 170. It is understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be a fourth generation (4G) communication network and a fifth generation (5G) communication network, for example.

Referring to FIGS. 1 and 2A, the wireless communication module 110 may include at least one of a 4G wireless communication module 111, a 5G wireless communication module 112, a short-range communication module 113, and a location information module 114. With regard to this, the 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an intermediate frequency (IF) band and a base processor. Meanwhile, the RF module 1200 may be implemented as a radio frequency (RF) transceiver circuit operating in an RF frequency band of each communication system. However, the present disclosure is not limited thereto, and the 4G wireless communication module 111, the 5G wireless communication module 112, the short-range communication module 113, and the location information module 114 may be interpreted to include RF modules, respectively.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, a 5G frequency band that is the same as a 4G frequency band may be used, and this may be referred to as LTE re-farming. In some examples, a Sub-6 frequency band that is a band of 6 GHz or less may be used as the 5G frequency band.

In contrast, a millimeter-wave (mmWave) band may be used as the 5G frequency band to perform wideband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112, respectively.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks may be a wireless personal area network.

Meanwhile, short-range communication between electronic devices may be performed using the 4G wireless communication module 111 and the 5G wireless communication module 112. In one embodiment, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g., red, green, blue (RGB) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio output module 152, a haptic module 153, and an indicator 154.

With regard to this, the display 151 may have an interlayered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical system (micro) electromechanical systems (MEMS) displays, or an electronic paper display. For example, the display 151 may display various contents (e.g., text, images, videos, icons, and/or symbols, etc.). The display 151 may include a touch screen, and may receive a touch, gesture, proximity, or hovering input using, for example, an electronic pen or a part of a user's body.

Meanwhile, the display 151 may include a touch panel 151a, a hologram device 151b, and a projector 151c and/or a control circuit for controlling them. In this regard, the panel may be implemented to be flexible, transparent, or wearable. The panel may include a touch panel 151a and one or more modules. The hologram device 151*b* may show a stereoscopic image in the air by using interference of light. The projector 151*c* may display an image by projecting light on a screen. The screen may be located, for example, inside or outside the electronic device 100.

The audio module 152 may be configured to interwork with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit serves as a passage with various types of external devices connected to the electronic device 100. The wired communication module 160 may include an HDMI 162, a USB 162, a connector/port 163, an optical interface 164, or a D-sub (D-subminiature) 165. Also, the wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in a base station unit. Accordingly, a distributed network may be implemented through the second server 320 implemented as the mobile edge cloud (MEC) 330, and content transmission delay may be shortened.

The memory 170 may include a volatile and/or nonvolatile memory. Also, the memory 170 may include an internal memory 170*a* and an external memory 170*b*. The memory 170 may store, for example, commands or data related to at least one of other components of the electronic device 100. According to one embodiment, the memory 170 may store software and/or a program 240. For example, the program 240 may include a kernel 171, middleware 172, an application programming interface (API) 173, an application program (or "application") 174, or the like. At least one of the kernel 171, the middleware 172, or the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may function as an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 typically functions to control an overall operation of the electronic device 100, in addition to the operations associated with the application programs. The processor 180 may provide or process information or functions appropriate for a user by processing signals, data, information and the like, which are input or output by the aforementioned various components, or executing application programs stored in the memory 170. Furthermore, the processor 180 may control at least some of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be an embedded battery or a replaceable battery. The power management module 191 may include a power management integrated circuit (PMIC), a charging IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 396, and a voltage, a current, or a temperature while the battery 396 is being charged. The battery 396 may include, e.g., a rechargeable battery or a solar battery.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an embodiment, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. To that end, a cloud computing, distributed computing, client-server computing, or mobile-edge cloud (MEC) technology may be used, for example.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIG. 1, the wireless communication system may include an electronic device 100, at least one external device 100a, a first server 310 and a second server 320. The electronic device 100 may be functionally connected to at least one external device 100a, and may control contents or functions of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. Also, the electronic device 100 may display contents or control functions by controlling the electronic device 100 based on an authentication result. According to an embodiment of the present disclosure, the electronic device 100 may be connected to at least one external device 100a through a wired or wireless communication interface to receive or transmit information. For example, the electronic device 100 and the at least one external device 100a include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100.

According to one embodiment, the at least one external device 100a may be functionally connected to the electronic device 100 using a wired/wireless communication module to control information for controlling content or a function in the electronic device 100.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

Figure 2B:
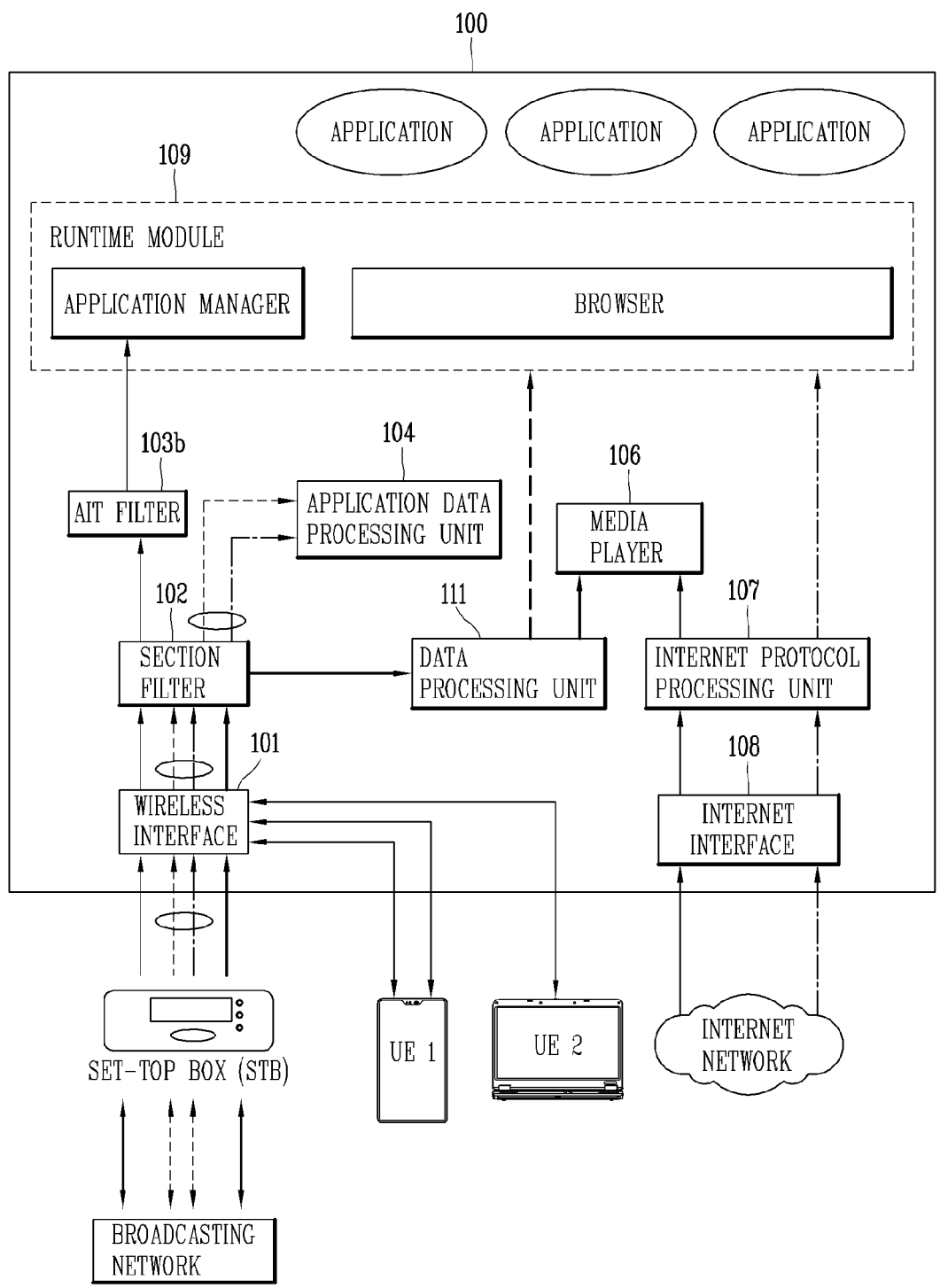
FIG. 2B is a diagram schematically illustrating an example of a whole of a wireless audiovisual (AV) system including an image display device according to another embodiment of the present disclosure.

FIG. 2B is a diagram schematically illustrating an example of a whole of a wireless audiovisual (AV) system including an image display device according to another embodiment of the present disclosure.

As illustrated in FIG. 2B, the image display device 100 according to another embodiment of the present disclosure is connected to the wireless AV system (or a broadcasting network) and an Internet network. The image display device 100 is, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via the Internet interface. In relation to this, the image display device 100 may be configured to be connected to a server or another electronic device via a 4G communication system or a 5G communication system. As an example, the image display device 100 needs to provide a 5G communication service operating in a mmWave band to transmit or receive large-capacity data at a high speed.

The image display device 100 may wirelessly transmit or receive data to/from an electronic device in a periphery of the image display device 100, e.g., a set-top box or another electronic device, via a wireless interface. As an example, the image display device 100 may transmit or receive wireless AV data to/from a set-top mediaFlo box arranged in front of or below the image display device 100 or another electronic device, e.g., a mobile terminal.

The image display device 100 includes, for example, a wireless interface 101b, a section filter 102b, an application information table (AIT) filter 103b, an application data processing unit 104b, a data processing unit 111b, a media player 106b, and an Internet protocol processing unit 107b, an Internet interface 108b, and a runtime module 109b.

Through a broadcast interface that is the wireless interface 101b, AIT data, real-time broadcast content, application data, and a stream event are received. The real-time broadcast content may be referred to as linear audio/video (A/V) content.

The section filter 102b performs section filtering on four types of data received through the wireless interface 101b, and transmits the AIT data to the AIT filter 103*b*, the linear A/V content to the data processing unit 111*b*, and the stream events and the application data to the application data processing unit 104*b*.

The non-linear A/V content and the application data are received through the Internet interface 108*b*. The non-linear AV content may be, for example, a content on demand (COD) application.

The non-linear AV content is transmitted to the media player 106*b*, and the application data is transmitted to the runtime module 109*b*.

Further, the runtime module 109*b* includes, for example, an application manager and a browser as illustrated in FIG. 2B. The application manager controls a life cycle of an interactive application using, for example, the AIT data. In addition, the browser performs, for example, a function of displaying and processing the interactive application.

Hereinafter, embodiments related to an array antenna operating in an mmWave band and an electronic device including the array antenna will be described with reference to the accompanying drawings. It will be apparent to those skilled in the art that the present disclosure may be embodied in other specific forms without departing from the spirit or essential characteristics thereof.

Hereinafter, a specific operation and function of the electronic device including the 4G/5G wireless communication module of FIG. 2A and a plurality of antennas according to an embodiment is described. In a 5G communication system according to an embodiment, a 5G frequency band may be a higher frequency band than a Sub-6 band. For example, the 5G frequency band may be a mmWave band, but is not limited thereto and may be changed according to applications.

Figure 3A:
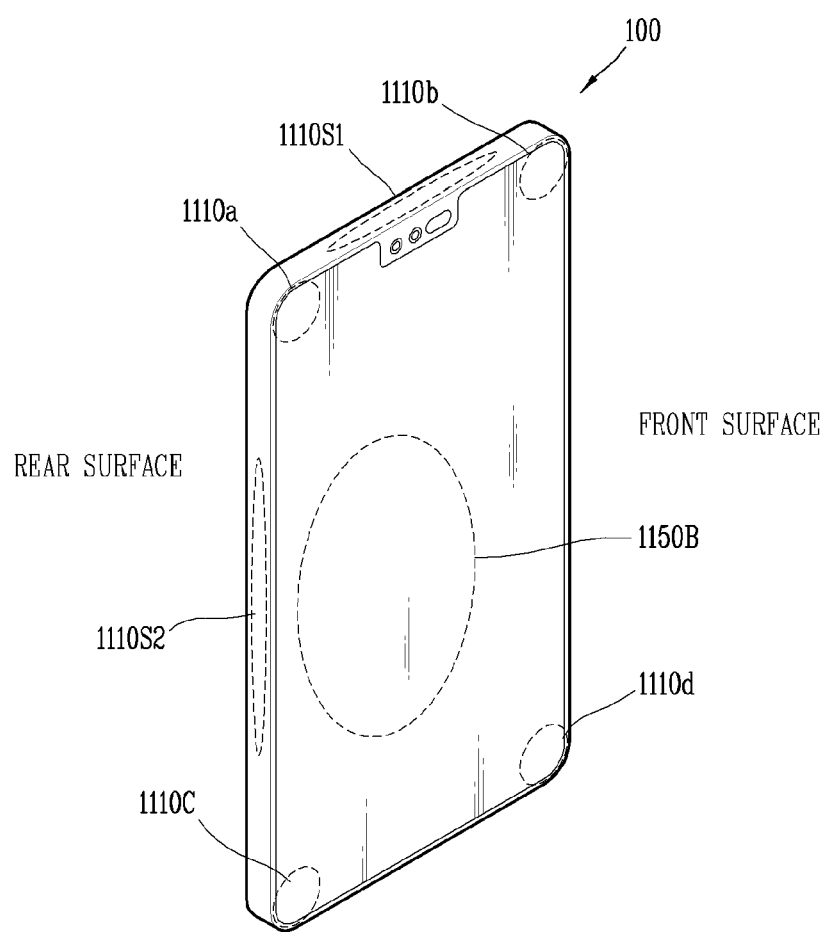
FIG. 3A illustrates an example of a configuration in which a plurality of antennas may be arranged in an electronic device according to an embodiment.

FIG. 3A illustrates an example of a configuration in which a plurality of antennas may be arranged in an electronic device according to an embodiment. Referring to FIG. 3A, a plurality of antennas 1110*a* to 1110*d* may be arranged inside or on a front surface of the electronic device 100. In this regard, the plurality of antennas 1110*a* to 1110*d* may be implemented in a form printed on a carrier in an electronic device or in a system-on-chip (Soc) form along with an RFIC. Meanwhile, the plurality of antennas 1110*a* to 1110*d* may be disposed on a front surface of the electronic device other than inside the electronic device. In this regard, the plurality of antennas 1110*a* to 1110*d* disposed on a front surface of the electronic device 100 may be implemented as transparent antennas embedded in a display.

On the other hand, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110*a* to 1110*d* may be configured to radiate 5G signals through the slot. Furthermore, antennas 1150B may be arranged on a rear surface of the electronic device 100 to radiate 5G signals to the back.

Meanwhile, in the present disclosure, at least one signal may be transmitted or received through the plurality of antennas 1110S1 and 1110S2 on a side surface of the electronic device 100. In addition, in the present disclosure, at least one signal may be transmitted or received through the plurality of antennas 1110*a* to 1110*d*, 1150B, 1110S1, and 1110S2 on a front and/or side surface of the electronic device 100. The electronic device may communicate with a base station through any one of the plurality of antennas 1110*a* to 1110*d*, 1150B, 1110S1, and 1110S2. Alternatively, the electronic device may perform MIMO communication with the base station through two or more antennas among the plurality of antennas 1110*a* to 1110*d*, 1150B, 1110S1, and 1110S2.

Figure 3B:
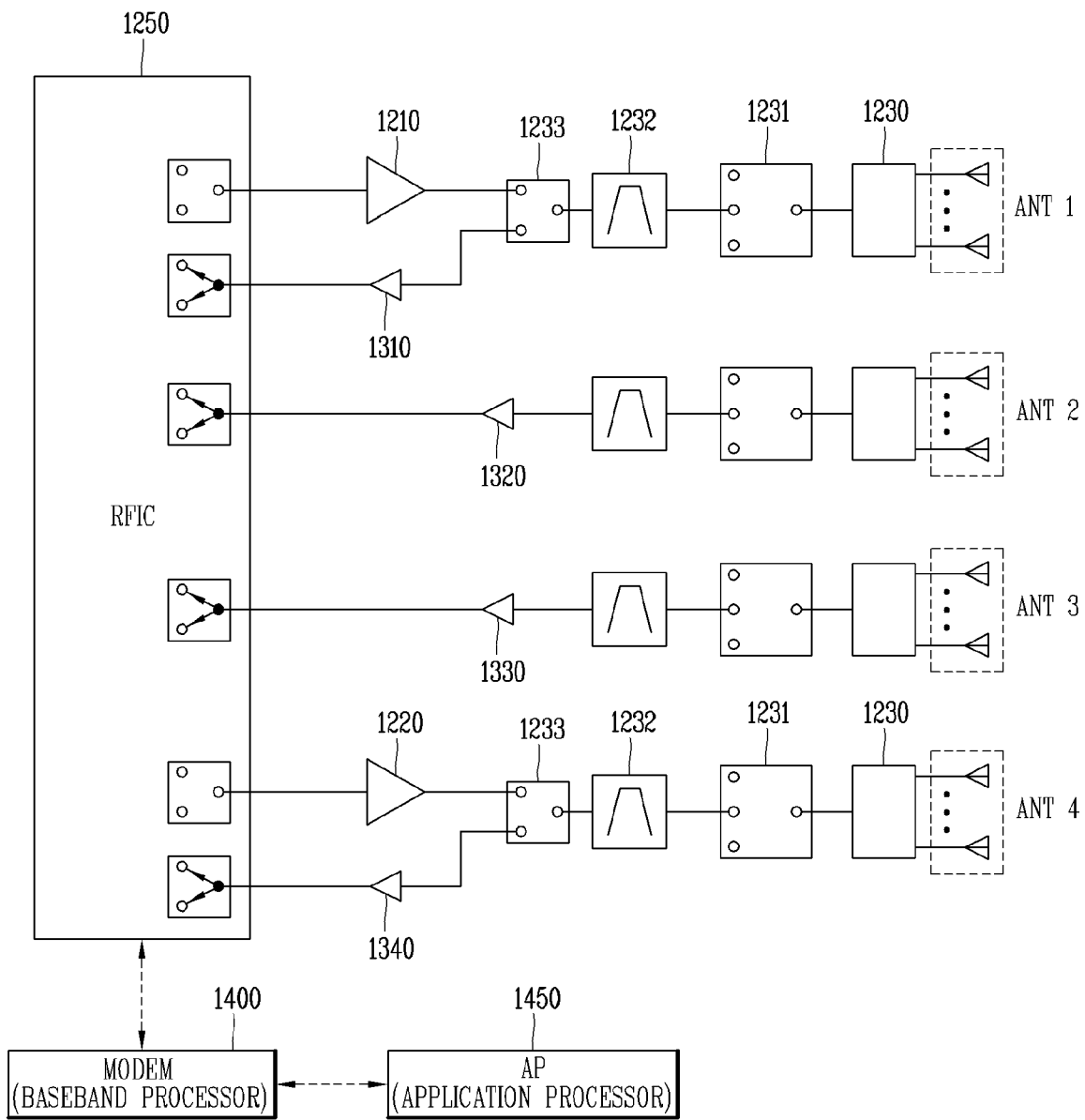
FIG. 3B illustrates a configuration of a wireless communication unit in an electronic device capable of operating in a fifth generation (5G) communication system according to an embodiment.

FIG. 3B illustrates a configuration of a wireless communication unit in an electronic device capable of operating in the 5G communication system according to an embodiment. Referring to FIG. 3B, the electronic device includes a first power amplifier 1210, a second power amplifier 1220, and a radio frequency integrated chip (RFIC) 1250. In addition, the electronic device may further include a modem 1400 and an application processor (AP) 1450. Here, the modem 1400 and the AP 1450 may be physically integrated into a single chip, to be logically and functionally separated from each other. However, the modem 1400 and the AP 1450 are not limited thereto and may be realized in the form of chips that are separated physically from each other, depending on application.

Meanwhile, the electronic device may include a plurality of low noise amplifiers (LNAs) 410 to 440 in a receiver. Here, the first power amplifier 1210, the second power amplifier 1220, the RFIC 1250, and the plurality of low noise amplifiers 1310 to 1340 are all operable in a first communication system and a second communication system. In this case, the first and second communication systems may be a 4G communication system and a 5G communication system, respectively, but are not limited thereto.

As illustrated in FIG. 3B, the RFIC 1250 may be integrally configured to serve for 4G and 5G, but may not be limited thereto. The RFIC 1250 may be configured to be separable into two parts, one for 4G and the other for 5G, depending on application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as the 4G/5G separated type, RF characteristics can be optimized for each of a 4G frequency band and a 5G frequency band.

Meanwhile, even when the RFIC 1250 is configured as the 4G/5G separated type, the 4G RFIC and the 5G RFIC may be logically and functionally separated from each other and may be implemented physically on one chip.

On the other hand, the application processor (AP) 1450 is configured to control operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of a transmitter and a receiver in a low power mode through the RFIC 1250.

In this regard, when it is determined that the electronic device is in an idle mode, the application processor (AP) 1450 may control the RFIC 1250 through the modem 1400 as follows. For example, when the electronic device is in an idle mode, the application processor 280 may control the RFIC 1250 through the modem 1400, such that at least one of the first and second power amplifiers 110 and 120 operates in the low power mode or is turned off.

According to another embodiment, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 1450 may control the modem 1400 and the RFIC 1250 to perform short-range communication using only the short-range communication module 113, even at the expense of throughput.

According to another embodiment, when the remaining battery level of the electronic device is above the threshold, the modem 1400 may be controlled to select an optimal wireless interface. For example, the application processor (AP) 1450 may control the modem 1400 to receive data through both the 4G base station and the 5G base station according to the remaining battery level and the available radio resource information. In this case, the application processor 1450 may receive battery level information from the PMIC, and the available radio resource information from the modem 1400. Accordingly, when the remaining battery level and the available radio resources are sufficient, the application processor (AP) 1450 may control the modem 1400 and the RFIC 1250 to receive data through both the 4G base station and 5G base station.

Meanwhile, a multi-transceiving system of FIG. 3B may integrate a transmitter and a receiver of each radio system into one transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system.

In addition, upon the separation for each communication system, the control of other communication systems according to necessity is impossible and thereby system delay extends. This makes it impossible to allocate resources efficiently. On the other hand, the multi-transceiving system as illustrated in FIG. 2 has advantages of controlling different communication systems according to necessity and minimizing system delay, which may result in enabling efficient resource allocation.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in the millimeter wave (mmWave) band, one of the first and second power amplifiers 1210 and 1220 may operate in the 4G band and the other may operate in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2. In this case, 4×4 DL MIMO may be performed through downlink (DL).

Meanwhile, when the 5G band is the Sub-6 band, first to fourth antennas ANT1 to ANT4 may be configured to all operate in the 4G band and the 5G band. On the contrary, when the 5G band is the millimeter wave (mmWave) band, the first to fourth antennas ANT1 to ANT4 may be configured to operate in one of the 4G band and the 5G band. In this case, when the 5G band is a millimeter wave (mmWave) band, a plurality of antennas may be individually configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented using 1Tx, only one of the first and second power amplifiers 1210 and 1220 may operate in the 5G communication band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 1250. Accordingly, a separate external component is not needed, thereby improving a component mounting configuration. In more detail, a single pole double throw (SPDT) type switch may be provided in the RFIC corresponding to the controller 1250 to select transmitters (TXs) of two different communication systems.

In addition, the electronic device that is operable in a plurality of wireless communication systems according to an embodiment may further include a phase controller 1230, a duplexer 1231, a filter 1232, and a switch 1233.

In a frequency band such as a mmWave band, the electronic device needs to use a directional beam to ensure a coverage for communication with a base station. To do so, the first to fourth antennas ANT1 to ANT4 need to be implemented as array antennas ANT1 to ANT4 that are to include a plurality of antenna elements, respectively. The phase controller 1230 may be configured to control a phase of a signal applied to each of the antenna elements of the array antennas ANT1 to ANT4. In relation to this, the phase controller 1230 may be configured to control both a magnitude and a phase of a signal applied to each of the antenna elements of the array antennas ANT1 to ANT4. Thus, since the phase controller 1230 controls both a magnitude and a phase of a signal, the phase controller 1230 may be also referred to as a power and phase controller 230.

Accordingly, a phase of a signal applied to each of the antenna elements of the array antennas ANT1 to ANT4 may be controlled to independently perform beamforming via each of the array antennas ANT1 to ANT4. In relation to this, MIMO may be performed via each of the array antennas ANT1 to ANT4. In this case, the phase controller 1230 may control a phase of a signal applied to each antenna element so that the array antennas ANT1 to ANT4 provide a beam in different directions.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by low noise amplifiers 310 and 340 through a second output port of the duplexer 1231.

The filter 1232 may be configured to allow a signal in the transmission band or the reception band to pass through and to block a signal in a band other than the transmission band and the reception band. In this case, the filter 1232 may include a transmission filter connected to the first output port of the duplexer 1231 and a reception filter connected to the second output port of the duplexer 1231. Alternatively, the filter 1232 may be configured to pass only the signals of the transmission band or only the signals of the reception band according to a control signal.

The switch 1233 is configured to transmit only one of the transmission signal and the reception signal. In an embodiment of the present disclosure, the switch 1233 may be configured in a single-pole double-throw (SPDT) type to separate a transmission signal and a reception signal in a time division duplex (TDD) scheme. Here, the transmission signal and the reception signal are signals of the same frequency band, and thus the duplexer 1231 may be implemented in the form of a circulator.

In another embodiment of the present disclosure, the switch 1233 may also be applied to a frequency division multiplex (FDD) scheme. In this case, the switch 1233 may be configured in a form of a double-pole double-throw (DPDT) to connect or block the transmission signal and the reception signal, respectively. On the other hand, the transmission signal and the reception signal may be separated by the duplexer 1231, and thus the switch 1233 is not necessarily required.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. The RFIC 1250 and the modem 1400 may be implemented as physically separated circuits. Alternatively, the RFIC 1250 and the modem 1400 may be logically or functionally distinguished from each other on one physical circuit.

The modem 1400 may perform control and signal processing for signal transmission and reception through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system at a specific time and frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 1310 to 1340 to receive a 4G signal or a 5G signal at a specific time interval.

Hereinafter, a specific configuration and function of the electronic device illustrated in FIGS. 1 to 2B and including the wireless interface of FIG. 3B is described. Transmission or reception of data between electronic devices needs to be performed using a communication service therebetween in a mmWave band. In relation to this, a wireless AV service may be provided using a 5G communication service.

There is a problem in that there is no specific solution for an antenna and an RFIC that provide a wireless interface in an electronic device such as an image display device in order to transmit an image with a resolution of 4K or higher. In particular, transmitting or receiving wireless AV data with another electronic device needs to be performed by taking into account a situation in which an electronic device such as an image display device is arranged on a wall of a building or on a table. To do so, a specific configuration of an area of the image display device in which the antenna and the RFIC are to be arranged, and a structure of the antenna need to be presented.

An antenna module may be arranged in an electronic device such as a mobile terminal to provide a communication service in the mmWave band. A 28 GHz band, a 39 GHz band, or a 64 GHz band may be taken into account as a frequency band to be allocated for a 5G communication service in the mmWave band. In relation to this, it is important to reduce an electrical loss by a transmission line between a plurality of array antennas and a transceiver circuitry in the mmWave band.

A circuit substrate on which the array antennas and the transceiver circuitry are arranged may be implemented as a multilayer substrate to optimize performance of several parts and reduce a substrate size.

However, when an antenna element in the mmWave band is arranged on the multilayer substrate, there is a problem such that antenna radiation efficiency may be reduced. In addition, when an antenna element in the mmWave band is arranged on the multilayer substrate, there is a problem such that a loss in a feeding unit configured to feed the antenna element may increase.

Figure 4:
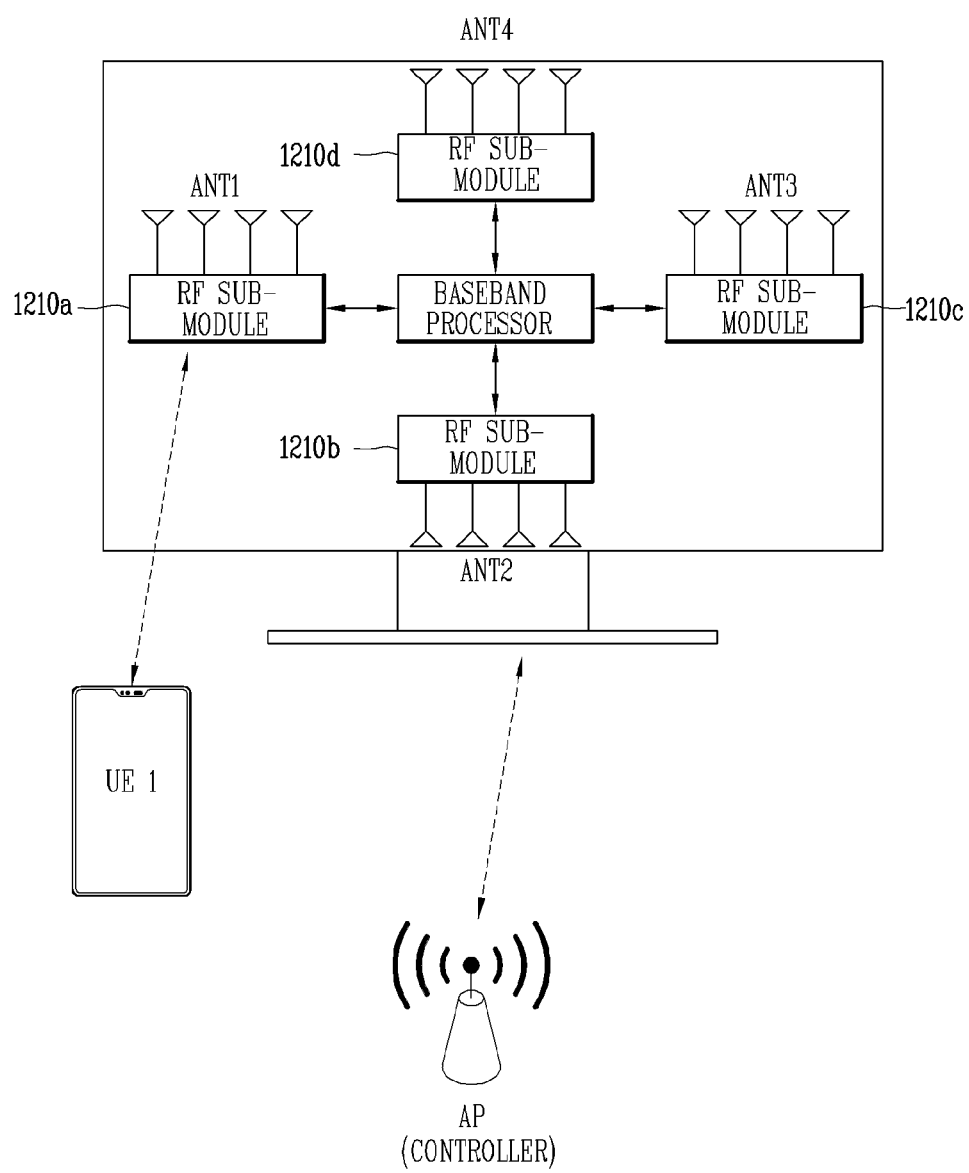
FIG. 4 illustrates an electronic device in which a plurality of antenna modules and a plurality of transceiver circuitries according to an embodiment are arranged.

Hereinafter, an electronic device having an antenna operable in a mmWave band according to the present disclosure will be described. In relation to this, FIG. 4 illustrates an electronic device in which a plurality of antenna modules and a plurality of transceiver circuit modules according to an embodiment are arranged. Referring to FIG. 4, a home appliance in which the antenna modules and the transceiver circuit modules are arranged may be a television, but is not limited thereto. Accordingly, in the present specification, the home appliance in which the antenna modules and the transceiver circuit modules are arranged may include any home appliance or a display device configured to support a communication service in the millimeter wave band.

Referring to FIG. 4, an electronic device 1000 includes a plurality of antenna modules, i.e., the first to fourth antennas ANT1 to ANT4 and a plurality of transceiver circuit modules 1210a to 1210d. In relation to this, the transceiver circuit modules 1210a to 1210d may correspond to a transceiver circuitry 1250 described above. Alternatively, the transceiver circuit modules 1210a to 1210d may be configured as a part of the transceiver circuitry 1250 or a part of a front-end module arranged between an antenna module and the transceiver circuitry 1250.

The antenna modules ANT1 to ANT4 may be configured as array antennas in which a plurality of antenna elements are arranged. A number of elements of the antenna modules ANT1 to ANT4 is not limited to two, three, four, or the like as illustrated in the drawing. For example, the number of the elements of the antenna modules ANT1 to ANT4 may extend to 2, 4, 8, 16, or the like. In addition, the elements of the antenna modules ANT1 to ANT4 may be selected in a same number or in different numbers. The plurality of antenna modules ANT1 to ANT4 may be arranged in different areas of a display. As illustrated in FIG. 16, the plurality of antenna modules ANT1 to ANT4 may be arranged in an upper portion, a left portion, a lower portion, or a right portion of the display. However, an arrangement structure thereof is not limited thereto. As another example, the antenna modules ANT1 to ANT4 may be arranged at an upper left portion, an upper right portion, a lower left portion, or a lower right portion of the display.

The antenna modules ANT1 to ANT4 may be configured to transmit or receive a signal in a specific direction in any frequency band. For example, the antenna modules ANT1 to ANT4 may operate in any one of a 28 GHz band, a 39 GHz band, and a 64 GHz band.

The electronic device may maintain a connection state with different entities through two or more of the antenna modules ANT1 to ANT4 or perform a data transmission or reception operation to maintain the connections state described above. In this regard, the electronic device corresponding to a display device may transmit or receive data with a first entity through the first antenna module ANT1. Also, the electronic device may transmit or receive data with a second entity through the second antenna module ANT2. As an example, the electronic device may transmit or receive data with a mobile terminal UE through the first antenna module ANT1. The electronic device may transmit or receive data with a control device such as a set-top box or an access point via the second antenna module ANT2.

Data may be transmitted or received with other entities through other antenna modules, e.g., the third antenna module ANT3 and the fourth antenna module ANT4. As another example, dual connection or MIMO may be performed through at least one of the first and second entities both previously connected via the third antenna module ANT3 and the fourth antenna module ANT4.

The transceiver circuit modules 1210a to 1210d may operate to process a transmission signal and a reception signal in an RF frequency band. Here, the RF frequency band may be any frequency band of a millimeter band, such as a 28 GHz band, a 39 GHz band, and a 64 GHz band, as described above. The transceiver circuit modules 1210a to 1210d may be referred to as RF sub-modules 1210a to 1210d, respectively. In this case, the number of the RF sub-modules 1210a to 1210d is not limited to four, and may be changed to an arbitrary number of two or more according to applications.

In addition, the RF sub-modules 1210a to 1210d include an up-conversion module and a down-conversion module both configured to convert a signal in the RF frequency band into a signal of in an intermediate frequency (IF) band or convert a signal in the IF frequency band into a signal in the RF frequency band. To this end, the up-conversion module and the down-conversion module may include a local oscillator (LO) capable of performing up-frequency conversion and down-frequency conversion, respectively.

With respect to the plurality of RF sub-modules 1210a to 1210d, a signal may be transmitted from one of the transceiver circuit modules to an adjacent transceiver circuit module. Accordingly, the signal may be configured to be transmitted to all of the transceiver circuit modules 1210a to 1210d at least once.

To do so, a data transfer path having a loop structure may be added. In relation to this, through a transmission path P2 having the loop structure, the RF sub-modules 1210b and 1210c adjacent to each other may bidirectionally transmit a signal.

Alternatively, a data transfer path having a feedback structure may be added. In relation to this, through the data transfer path having the feedback structure, at least one sub-module 1210c may transmit a signal to the other sub-modules 1210a, 1210b, and 1210c unidirectionally.

The plurality of RF sub-modules may include the first to fourth RF sub-modules 1210a to 1210d. In this regard, a signal from the first RF sub-module 1210a may be transmitted to the RF sub-module 1210b and the fourth RF sub-module 1210d both adjacent thereto. In addition, the second RF sub-module 1210b and the fourth RF sub-module 1210d may transmit the signal to the third RF sub-module 1210c adjacent thereto. In this case, when bidirectional transmission between the second RF sub-module 1210b and the third RF sub-module 1210c may be performed as shown in FIG. 4, this may be referred to as a loop structure. On the other hand, when only omnidirectional transmission between the second RF sub-module 1210b and the third RF sub-module 1210c may be performed, this may be referred to as a feedback structure. In the feedback structure, at least two signals may be transmitted to the third RF sub-module 1210c.

However, the structure is not limited thereto, and a baseband module may be included only in a particular module among the first to fourth RF sub-modules 1210a to 1210d depending on an application. Alternatively, depending on an application, the baseband module may not be included in the first to fourth RF sub-modules 1210a to 1210d, but may be configured as a separate controller, that is, a baseband processor 1400. For example, a control signal may be transmitted only by a separate controller, that is, the baseband processor 1400

Figure 5A:
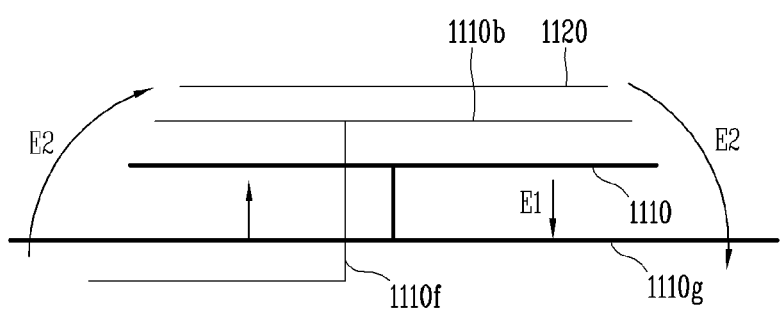
FIGS. 5A and 5B illustrate an antenna structure implemented in a form of graded ground layers according to various embodiments.
Figure 5B:
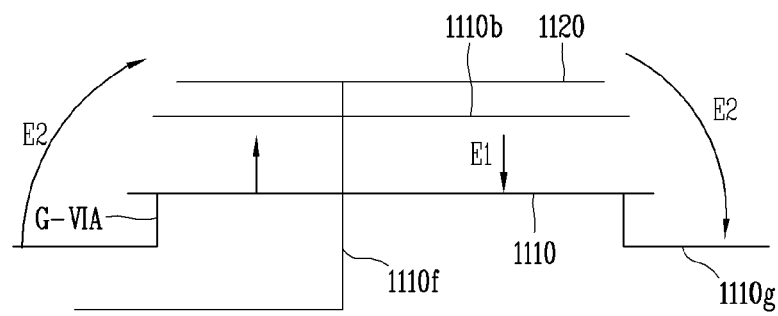

FIGS. 5A and 5B illustrate an antenna structure implemented in a form of stepped ground layers according to various embodiments. The stepped ground structure may be referred to as a graded ground structure.

FIG. 5A illustrates a structure in which a center portion of a lower patch 1100 is connected to a center portion of a ground 1110g. On the other hand, FIG. 5B illustrates a structure in which an edge portion of the lower patch 1100 is connected to a center portion of the ground 1110g.

Referring to FIG. 5A, since an electric field E1 provided below the lower patch 1100 determines an antenna impedance, a height of the lower patch 1110 may not be increased unconditionally. On the other hand, an electric field E2 provided between the upper patch 1120 and the ground 1110g is an electric field in which radiation is performed toward outside of an antenna. When the electric field E2 is apart from the ground 1110g, radiation toward the outside of the antenna is enhanced.

FIG. 5B illustrate a structure of a patch antenna to which stepped ground layers are applied, and an electric field generated according to the patch antenna. Referring to FIG. 5B, an antenna impedance may be freely adjusted using a stepped ground, and height freedom of a patch antenna including the lower patch 1110 occurs. As an antenna height is increased using the stepped ground, antenna radiation is enhanced due to the electric field E2 provided between the upper patch 1120 and the ground 1110g. Accordingly, antenna radiation efficiency is increased, and thus, an antenna gain is enhanced.

Figure 6A:
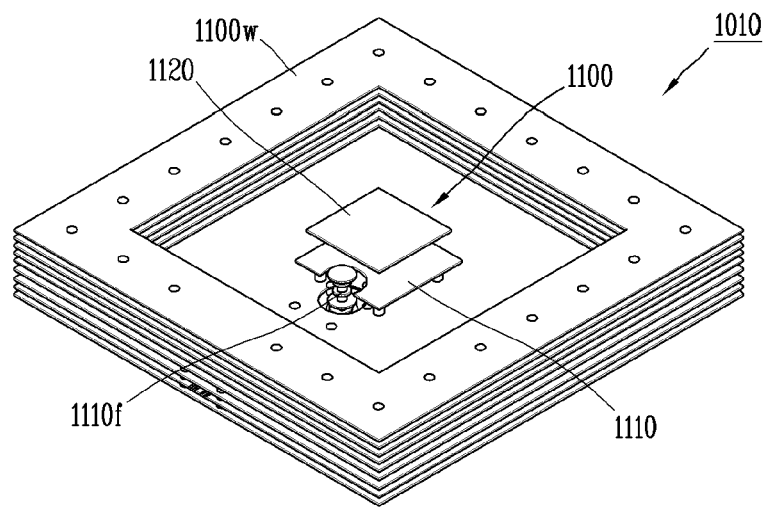
FIGS. 6A to 6C are a perspective view, a side view, and a front view of an antenna module implemented as a multilayer substrate according to an embodiment, respectively.
Figure 6B:
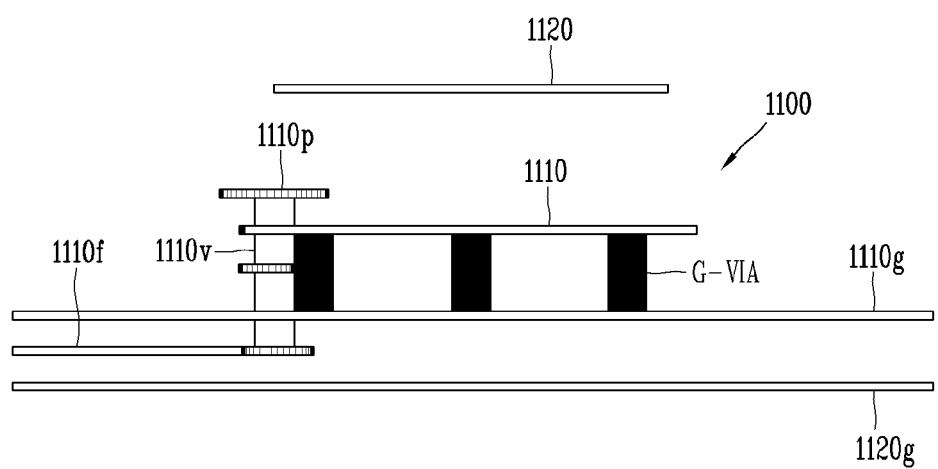
Figure 6C:
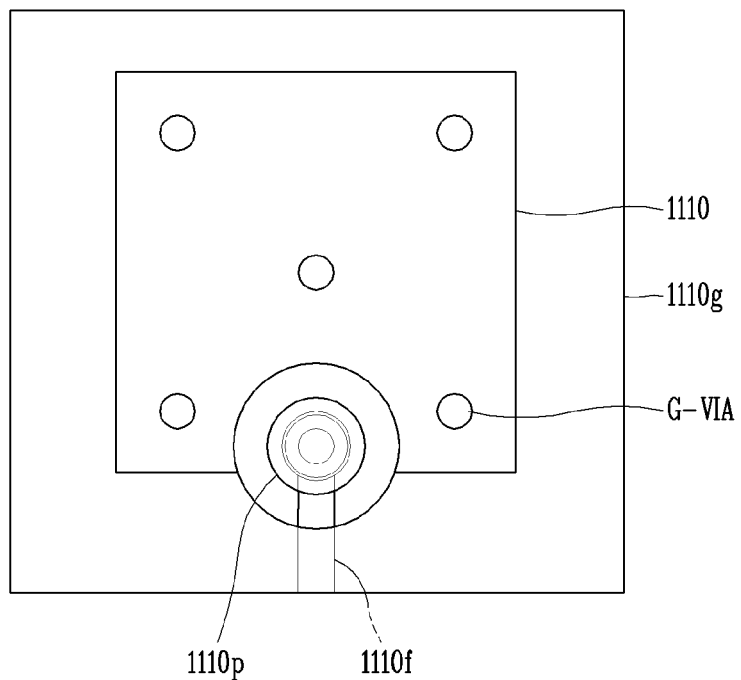

An antenna disclosed herein may be implemented as a multilayer substrate. In relation to this, FIGS. 6A to 6C are a perspective view, a side view, and a front view of an antenna module implemented as a multilayer substrate, respectively, according to an embodiment. In relation to this, FIGS. 6A and 6C are an internal perspective view and an internal front view of an antenna module with an internal structure of a multilayer substrate.

Referring to FIGS. 1 to 6C, the electronic device 100 according to the present disclosure may include an antenna 1100 and a multilayer substrate 1010. In relation to this, the multilayer substrate 1010 may be provided with the antenna 1100, and include a front layer, a back layer, a plurality of middle layers, and a plurality of ground layers.

The antenna 1100 may indicate a single antenna element or an array antenna including a plurality of antenna elements. The antenna 1100 may be configured to include the lower patch 1110 and the upper patch 1120. In relation to this, one of the lower patch 1110 and the upper patch 1120 may be referred to as a first patch, and the other may be referred to as a second patch.

The antenna 1100 disclosed herein may be configured as a stack type patch antenna to expand a bandwidth of the antenna 1100. The antenna 1100 may operate in a mmWave band. As an example, the antenna 1100 may be configured to cover a 60 GHz band (57.2 to 70.2 GHz). In relation to this, a bandwidth may be expanded by a stack type patch antenna. However, performance in a high frequency band may deteriorate due to parasitic resonance generated between the lower patch 1110 and the upper patch 1120.

Accordingly, hereinafter, in addition to a structure in which a feeding line 1110f is directly connected to the lower patch 1100 and the upper patch 1120 is coupled to the lower patch 1110, a method of further improving bandwidth performance is proposed. In relation to this, as illustrated in FIGS. 5A and 5B, the feeding line 1110f may be electrically connected to a second lower patch 1110b arranged above the lower patch 1110. Thus, an amount of coupling to the upper parch 1120 corresponding to a parasite patch is reduced. Accordingly, characteristics of performance deterioration in a high frequency band due to parasite resonance may be relieved. In this case, a change in characteristics due to an increase in a distance between the second lower patch 1110b and the ground 1110g may be relieved through a ground via G-via arranged in an edge portion of the lower patch 1110.

As described above, the upper patch 1120 of the antenna 1100 described herein may be arranged to be apart from the lower patch 1110 by a predetermined distance. The lower patch 1110 may be arranged on a different layer from that of an upper ground 1100g among a plurality of ground layers. The lower patch 1110 may be electrically connected to the upper ground 1100g at a plurality of offset points.

Referring to FIGS. 5B and 6A, the upper patch 1120 may operate as a radiator, and the lower patch 1110 may be arranged below the upper patch 1120. At least one via in the lower patch 1110 may be electrically connected to the upper ground 1110g corresponding to a ground surface. The lower patch 1110 and the upper ground 1110g may be connected to each other to provide a stepped ground. A feeding pad 1100p configured to feed the patch antenna is electrically connected to the feeding line 1110f via a vertical via 1100v. A ground wall 1100w may be provided at an edge with reference to a radiator, a stepped ground, and a feeding pad. The ground wall 1100w may include conductor layers arranged on each layer of the multilayer substrate 1010 and vias connecting the conductor layers. Thus, the conductor layers arranged in the multilayer substrate 1010 may be provided to surround the antenna 1110.

Referring to FIG. 6B, the upper patch 1120 arranged on an uppermost portion operates as a radiator, and energy is transmitted from the feeding pad 1110p to the upper patch 1120, i.e., the radiator by coupling feeding. A feeding method using the feeding pad 1110p may be direct feeding or indirect feeding (coupling).

The stepped ground is arranged on a lower layer of the feeding pad 1110p for coupling, and electrically connected to the upper ground 1110g through the ground via G-via. The feeding pad 1110p is configured to be connected to the feeding line 1110f through the vertical via 1110v for feeding. In this case, the multilayer substrate 1010 may include the feeding line 1110f. The feeding line 1110f may be arranged between the upper ground 1110g and the lower ground 1120g. The feeding line 1110f may penetrate through the upper ground 1110g to be electrically connected to the lower patch 1110. In this case, a ground region may be removed from in a region in which the feeding line 110f penetrates through the upper ground 1110g.

The feeding line 1110f may be configured to be electrically connected to the feeding pad 1110p. In relation to this, the feeding line 1110f may penetrate through the lower patch 1110 to be electrically connected to the feeding pad 1110p arranged on a layer between the lower patch 1110 and the upper patch 1120.

In the present embodiment, the feeding line 1110f may be arranged between the upper ground 1110g and the lower ground 1110g and configured as a strip line. In this case, the feeding line 1110f may be provided as a microstrip line. However, a shape/position of the feeding line 1110f is not limited the present embodiment.

Referring to FIGS. 6A to 6C, a size of the lower patch 1110 may be same as or different from that of the upper patch 1120. A center portion of the lower patch 1110 may substantially match that of the upper patch 1120, or be apart from that of the upper patch 1120 to provide an offset structure. In addition, shapes of the lower patch 1110 and the upper patch 1120 are not limited to rectangular patches, and may be provided differently.

The vertical via 1110v corresponding to a feeding via, and the feeding pad 1110p may be or may not be physically connected to the lower patch 1110. As an example, a feeding structure through the vertical via 1110v may be designed not to penetrate through the lower patch 1110 on the stepped ground.

The ground via G-via in the stepped ground may be arranged in at least one edge region. In relation to this, the edge region may include a region in a periphery of an edge line of a rectangular patch or an internal region corresponding to a predetermined space apart from an edge line. The ground via G-via may be arranged in a central region of a rectangular patch according to applications. In relation to this, when the ground via G-via is arranged in the edge region, even when the ground via G-via is further arranged in a central region, a significant change in antenna characteristics may not occur. However, the ground via G-via may be also arranged in a central region for mechanical stability such as stability against an external shock on the multilayer substrate 1010 and convenience of a manufacture process.

In relation to the stepped ground structure described above, the lower patch 1110 and the upper ground 1110 may be connected to each other via one or more ground vias G-via as described below. In relation to this, FIG. 7 illustrates one or more ground vias provided in an edge region of a patch according to various embodiments of the present disclosure.

Figure 7:
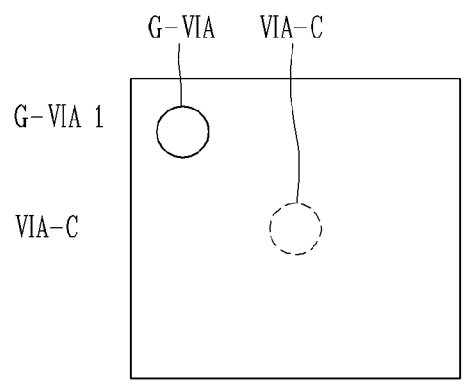
FIG. 7 illustrates one or more ground vias provided in an edge region of a patch according to various embodiments of the present disclosure.
Figure 7:
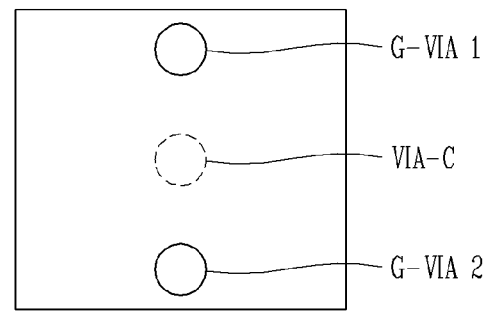
Figure 7:
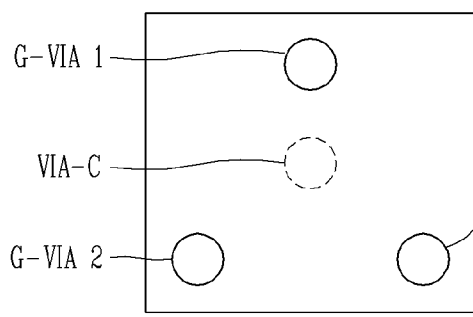
Figure 7:
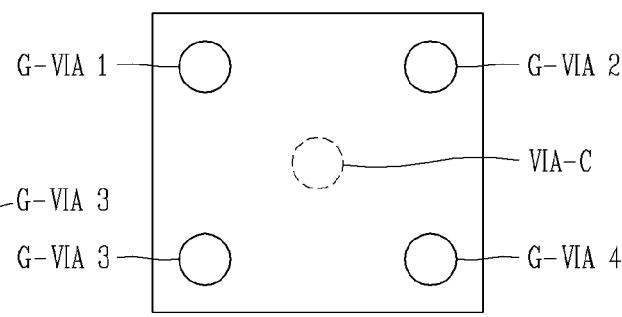

Referring to FIGS. 5A to 6C and (a) of FIG. 7, one ground via G-via may be arranged in one side region of one of four edges regions of the lower patch 1110. In relation to this, a ground via via-c may be arranged in a central region of the edge region. However, when the ground via via-c is arranged in a central region of the edge region, the ground via G-via in the edge region may be arranged in one side region to increase a distance between the ground via via-c and the ground via G-via.

Referring to FIGS. 5A to 6C and (b) of FIG. 7, two ground vias G-via1 and G-via2 may be arranged in regions facing each other. In relation to this, the ground vias G-via1 and G-via2 may be provided at a plurality of offset points offset from a center point of the lower patch 1110. Thus, the lower patch 1110 is connected to the upper ground 1110g via the ground vias G-via1 and G-via2 to provide stepped ground layers.

As an example, at the plurality of offset points offset from the center point of the lower patch 1110, the lower patch 1110 may be electrically connected to the upper ground 1110g through a ground via in a first axis direction. In this case, the ground via via-c may be arranged in a central region of the edge region. The ground vias G-via1 and G-via2 may be arranged in a central region of the edge region, separately from the ground via via-c in a central region. However, arrangement of ground vias is not limited to such an arrangement structure. The ground vias G-via1 and G-via2 may be arranged in a left region and a right region of the edge region, respectively.

Referring to FIGS. 5A to 6C and (c) of FIG. 7, three ground vias G-via1 to G-via3 may be arranged in regions facing each other. As an example, one ground via G-via1 is arranged in a first edge region, and other ground vias G-via2 and G-via3 may be arranged in a second edge region. As an example, three ground vias G-via1 to G-via3 may be arranged in a triangle shape. In this case, the three ground vias G-via1 to G-via3 may be arranged in a triangle shape with reference to the ground via via-c arranged in a central region of the edge region.

In relation to this, at a plurality of offset points offset from a center point of the lower patch 1110, the lower patch 1120 may be electrically connected to the upper ground 1110g through the ground vias G-via1 to G-via3. In detail, at a plurality of offset points, the lower patch 1120 may be electrically connected to the upper ground 1110g through the ground vias G-via1 to G-via3 in first and second axis directions. Here, the second axis direction may be a direction vertical to the first axis direction, but is not limited thereto.

Referring to FIGS. 5A to 6C and (d) of FIG. 7, four ground vias G-via1 to G-via4 may be arranged in regions facing each other. As an example, two ground vias G-via1 and G-via2 are arranged in the first edge region, and other two ground vias G-via3 and G-via4 may be arranged in the second edge region. As an example, four ground vias G-via1 to G-via4 may be arranged in a rectangular shape. In this case, the four ground vias G-via1 to G-via4 may be arranged in a triangle shape with reference to the ground via via-c arranged in a central region of the edge region.

Referring to FIGS. 5A to 6, and (c) and (d) of FIG. 7, the lower patch 1110 and the upper ground 1110g may be electrically connected to each other through the plurality of ground vias G-via1 to G-via3 or G-via1 to G-via4 arranged in an edge region of the lower patch 1110. In relation to this, three or more ground vias G-via1 to G-via3 or G-via1 to G-via4 may be provided, and the plurality of ground vias may be arranged in a triangle or rectangular arrangement structure.

Figure 8:
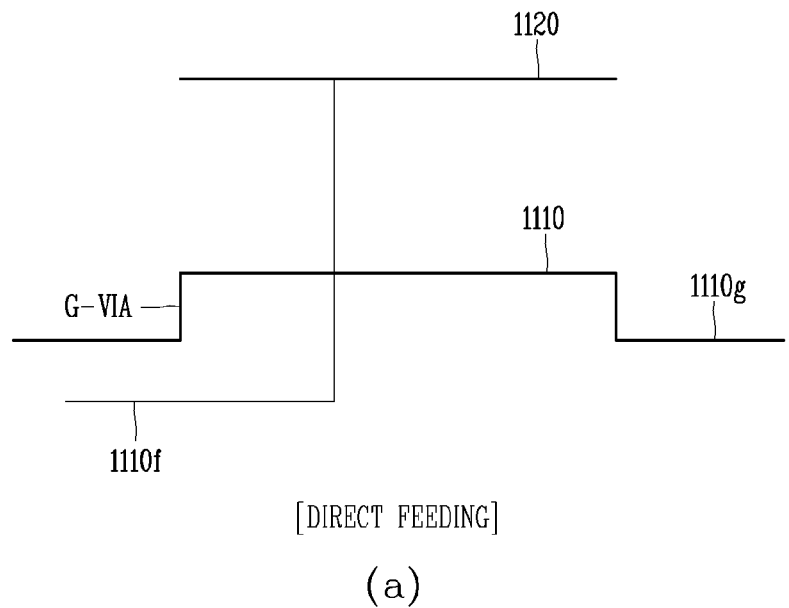
FIGS. 8 to 10 illustrate a feeding structure and an antenna structure both to which a graded ground is applied according to various embodiments of the present disclosure.
Figure 8:
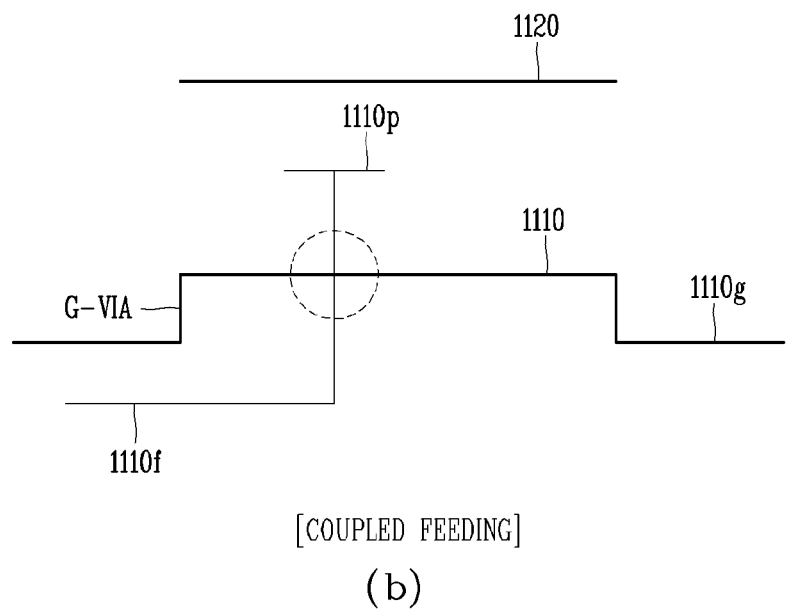
Figure 9:
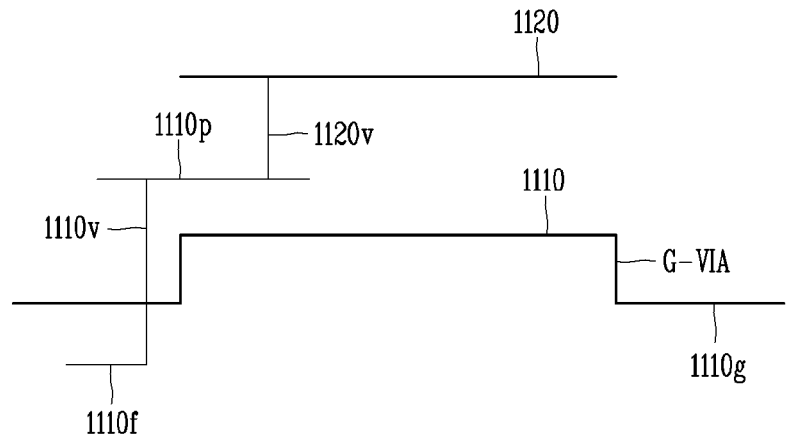
Figure 9:
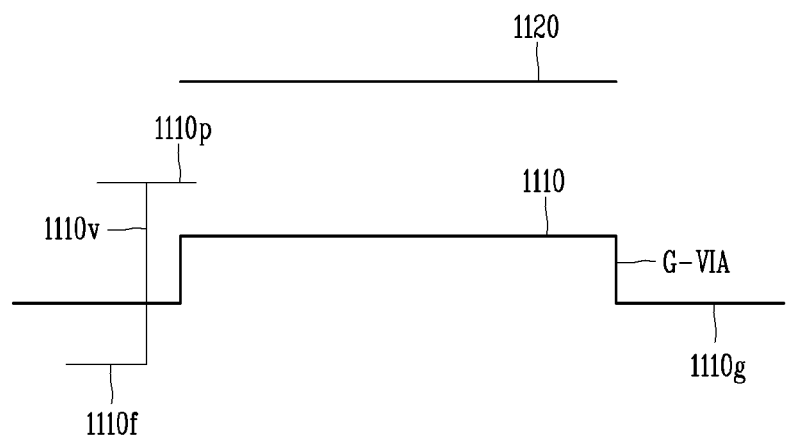
Figure 9:
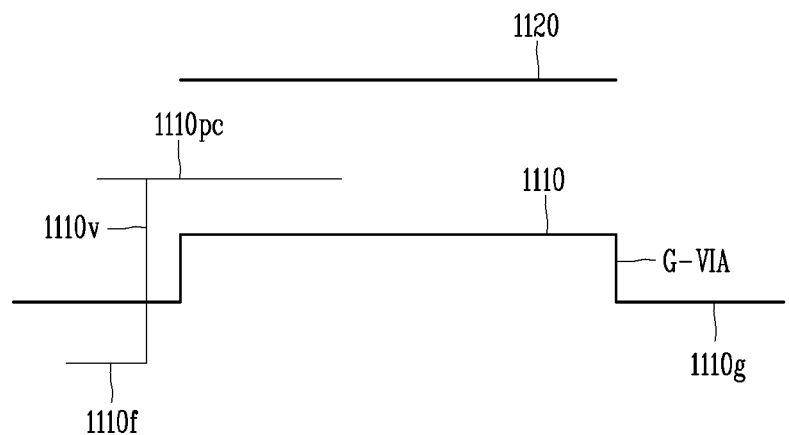
Figure 10:
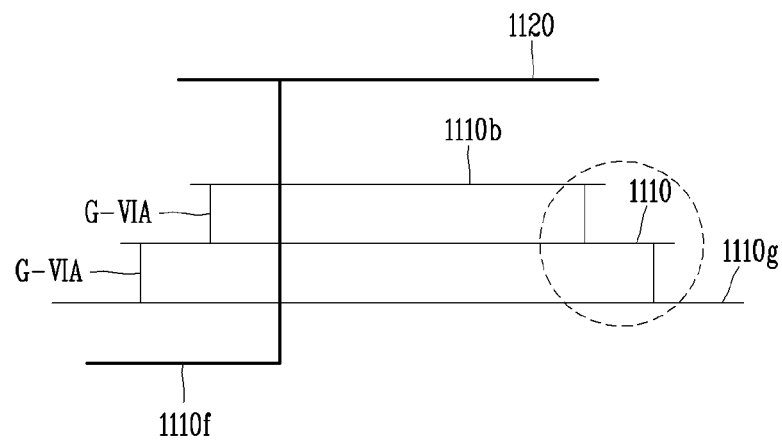
Figure 10:
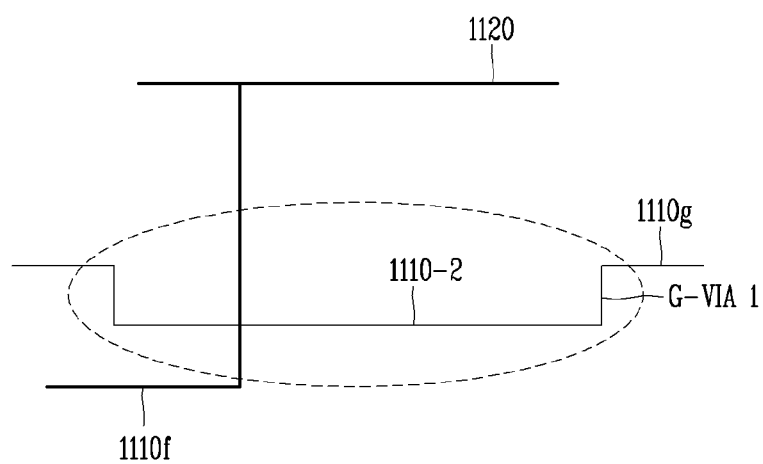
Figure 10:
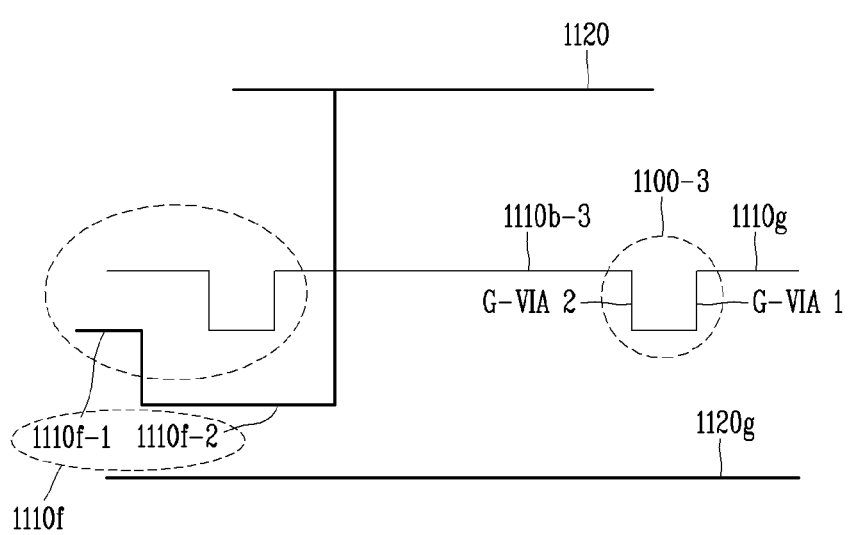

A feeding structure to which a stepped ground, disclosed herein, is applied may be implemented as various embodiments. In relation to this, FIGS. 8 to 10 illustrate a feeding structure and an antenna structure both to which a stepped ground according to various embodiments of the present disclosure is applied. FIG. 8 illustrates a feeding structure in which a feeding via penetrates through the lower patch 1110 provided with a stepped ground. On the other hand, FIG. 9 illustrates a feeding structure in which a feeding via does not penetrate through the lower patch 1110 provided with a stepped ground but is provided through an adjacent region. That is, FIG. 9 illustrates a feeding structure configured to prevent distortion in a region in which a stepped ground is provided. FIG. 10 illustrates a modified structure in which a number of layers and a form of a stepped ground is modified, and a feeding structure included in the modified structure.

Referring to FIGS. 5A to 7, and (a) of FIG. 8, the feeding line 1110f may penetrate through the lower patch 1110 to be electrically connected to the upper patch 1120. In this case, the feeding line 1110f may be or may not be electrically connected to the lower patch 1110. A metal pattern may be removed from a region in which the feeding line 1110f penetrates through the lower patch 1110 not to be electrically connected to the lower patch 1110. The lower patch 1110 may be connected to the lower ground 1110g through the ground via G-via to implement a stepped ground. The feeding structure shown in (a) of FIG. 8 may be referred to as a direct feeding structure.

On the other hand, referring to FIGS. 5A to 7, and (b) of FIG. 8, the feeding line 1110f may be connected to the coupling pad 1110p to be electrically coupled to the upper patch 1120 by penetrating through the lower patch 1110. In this case, the feeding line 1110f may be or may not be electrically connected to the lower patch 1110. A metal pattern may be removed from a region in which the feeding line 1110f penetrates through the lower patch 1110 not to be electrically connected to the lower patch 1110. The lower patch 1110 may be connected to the lower ground 1110g through the ground via G-via to implement a stepped ground. A feeding structure of (b) of FIG. 8 may be referred to as a coupled feeding structure.

Referring to FIGS. 5A to 7, and (a) of FIG. 9, the feeding line 1110f may be provided in a zig-zag pattern. The feeding line 1110f may be configured to penetrate through the lower ground 1110g corresponding to a region in which the lower patch 1110 is not arranged. In addition, the feeding line 1110f may be electrically connected to the feeding pad 1110p arranged on a layer between the lower patch 1110 and the upper patch 1120.

The feeding line 1110f may be electrically connected to the upper patch 1120 through the feeding pad 1100p. In relation to this, the feeding line 1110f connected to the feeding pad 1110p at a first point through a first vertical via 1110v may be connected to the upper patch 1120 at a second point through a second vertical via 1120v. The lower patch 1110 may be connected to the lower ground 1110g through the ground via G-via.

Referring to FIGS. 5A to 7, and (a) of FIG. 9, a feeding structure using a feeding line 1110f may be provided using a coupling method. In relation to this, the feeding line 1110fb may be electrically connected to the feeding pad 1110p, but may not be directly connected to the upper patch 1120. As an example, the feeding line 1110fp may be connected to a center portion of the feeding pad 1110p, but is not limited thereto.

Referring to FIGS. 5A to 7, and (c of FIG. 9, a feeding structure using the feeding line 1110fc may be provided using an offset coupling method. In relation to this, the feeding line 1110f may be electrically connected to the feeding pad 1110pc through a vertical via at a point apart from a center of the feeding pad 1110pc by a predetermined distance. Accordingly, the feeding line 1110fc may be electrically connected to the feeding pad 1110*pc* in an offset structure. In this case, the feeding pad 1110*pc* may have a line shape a part of which is implemented as a straight line, instead of having a circular shape. Accordingly, the feeding pad 1110*pc* may be provided such that a length of one side among upper, lower, left, and right sides is longer than that of other sides. By doing so, the upper patch 1120 that is a radiator may be fed asymmetrically in an optimum configuration, without having to modifying a stepped ground. Thus, coupling feeding to the upper patch 1120 may be optimally performed through the feeding pad 1110*pc* having an asymmetrical structure to prevent deterioration in antenna characteristics in a high band which may be caused by parasite resonance.

As described above, FIG. 10 illustrates a modified structure in which a number of layers and a form of a stepped ground are modified, and a feeding structure in the modified structure. Referring to FIG. 10, at least one via in an edge region electrically connects a patch to a ground to provide a stepped ground. In relation to this, a via in a center portion of a patch does not affect whole antenna performance. Accordingly, a via may be arranged in a center portion of a patch for mechanical stability and process stability. Alternatively, a via may not be arranged in a center portion of a patch. A position indicated by an edge region corresponding to a boundary may be defined as a region other than a central region of an upper patch and a central region of a lower patch among a vertical surface of a stack-type printed circuit board (PCB).

Referring to FIGS. 5A to 7, and (a) of FIG. 10, a stepped ground structure may be provided as a stepped ground structure including three or more steps. In relation to this, the antenna 1100 may be arranged on the lower patch 1110, and further include a second lower patch 1110*b* electrically connected to the lower patch 1110 at a plurality of offset points. Accordingly, the antenna 1100 may be configured to include the lower patch 1110, the second lower patch 1110*b*, and the upper patch 1120.

In relation to this, the stepped ground structure may be provided using the lower ground 1110*g* and the lower patch 1110. Alternatively, the stepped ground structure may be provided using the lower ground 1100*g*, the lower patch 1110, and the second lower patch 1110*b*. Due to the stepped ground structure having three or more steps, a height change in a ground does not occur significantly in a particular region. Thus, as a height change in a ground may occur step by step in a particular region, antenna characteristics may be maintained in a wide frequency band.

The feeding line 1110*f* may penetrate through the lower patch 1110 and the second lower patch 1110*b* to be electrically connected to the upper patch 1120. Alternatively, the feeding line 1110*f* may penetrate through the lower patch 1110 and the second lower patch 1110*b* to be electrically connected to the feeding pad 1110*p* arranged on a layer between the second lower patch 1110*b* and the upper patch 1120.

Referring to FIGS. 5A to 7, and (a) of FIG. 10, a stepped ground structure may be provided as an inverted stepped ground structure. In relation to this, the antenna 1100 may be provided such that a lower patch 1110-2 is arranged on a layer below the upper ground 1110*g*. The feeding line 1110*f* may penetrate through the lower patch 1110-2 below the upper ground 1110*g* to be electrically connected to the upper patch 1120. Antenna impedance characteristics may be adjusted using the inverse stepped ground structure. As an example, an impedance converter having a high impedance may be implemented in a transition region in which a height of a strip line structure is reduced, the transition region being provided with the feeding line 1110*f*. On the other hand, the feeding line 1110*f* having a low impedance may be implemented in a section in which a height of a strip line structure increases.

Referring to FIGS. 5A to 7, and (c) of FIG. 10, a stepped ground structure may be provided as a partial stepped ground structure. That is, two lower patches 1110-3 may be arranged on a layer below the upper ground 1110*g*. In this case, the lower patch 1110-3 may be arranged to partially overlap two edge regions of the upper patch 1120. The antenna 1100 may further include a second lower patch 1110*b*-3 arranged on a same layer of that of the upper ground 1110*g*. By using the partial stepped ground structure, a strip line structure in which a height in a particular section is maintained within a predetermined range may be provided. That is, as a ground height of the partial stepped ground structure is changed, a height of the feeding line 1100*f* may be also changed.

In detail, one end of the lower patch 1110-3 is connected to the upper ground 1110*g* through the first ground via G-via1, and another end of the lower patch 1110-3 may be connected to the second lower patch 1110*b*-3 through the second ground via G-via2.

In the partial stepped ground structure, the feeding line 1110*f* may be provided as a strip line in having a multi-layered structure. The feeding line 1110*f* may be configured to include a first feeding line 1110*f*-1 and a second feeding line 1110*f*-2. The first feeding line 1110*f*-1 may be arranged between the upper ground 1110*g* and the lower ground 1110*g*. The second line 1110*f*-2 may be connected to the first feeding line 1110*f*-1 through a vertical via, and arranged on a layer below the first feeding line 1110*f*-1. Thus, the second feeding line 1110*f*-2 may form a partial stepped ground region in a region including a region in which the first ground via G-via1 and the second ground via G-via2 are provided.

A feeding structure described herein may be provided through an external region of a lower patch corresponding to a stepped ground, or provided to at least partially penetrate through an internal region of a lower patch. In relation to this, FIGS. 11A and 11B illustrate a feeding structure of an antenna having a stepped ground according to various embodiments.

Figure 11A:
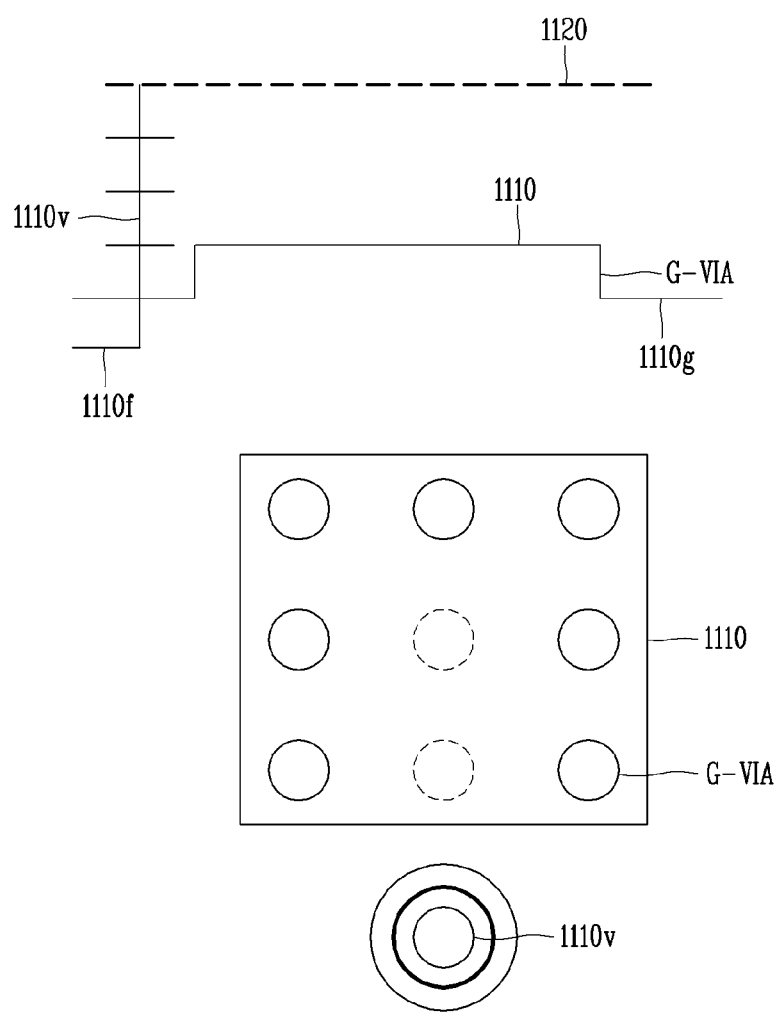
FIGS. 11A and 11B illustrate a feeding structure of an antenna having a graded ground according to various embodiments.
Figure 11B:
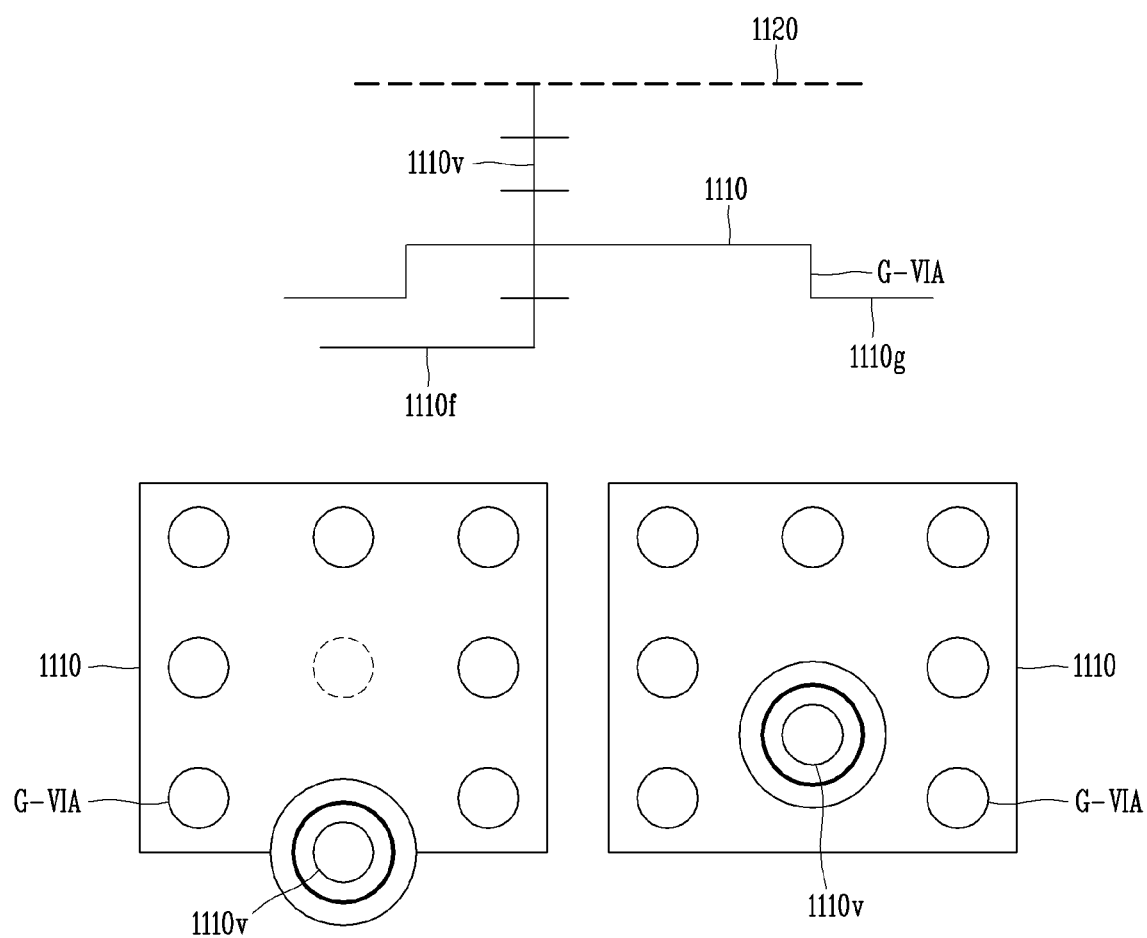

Referring to FIGS. 11A and 11B, the feeding line 1110*f* and the ground via G-via may be provided such that an antenna performance change in the lower patch 1110 providing a stepped ground rarely occurs. In relation to this, the ground via G-via for providing a stepped ground may be removed in a region in which a feeding via according to the feeding line 1110*f* is located or in a peripheral region of the feeding via, Referring to FIGS. 5A to 7 and 11A, a feeding structure may be arranged outside a region in which a stepped ground is provided. The multilayer substrate 1010 may include the feeding line 1110*f* arranged between the upper ground 1110*g* and the lower ground 1110*g*. The feeding line 1110*f* may be configured to penetrate through the lower ground 1110*g*. In this case, the lower ground 1110*g* through which the feeding line 1110*f* penetrates may correspond to a region in which the lower patch 1110 is not arranged.

In relation to this, the ground via G-via connected to the upper ground 1110*g* may be arranged in all four edge regions of the lower patch 1110. As an example, the ground via G-via may be arranged in all of a central region, a left region, and a right region with respect to each of the four edge regions. A region in which the feeding line 1110*f* penetrates through the lower ground 1110a corresponds to outside of the lower patch 1110. Accordingly, the ground via G-via may be arranged in both of an edge region and a central region of the lower patch 1110.

Referring to FIGS. 5A to 7 and 11B, a feeding structure may be arranged inside a region in which a stepped ground is provided. A region in which the feeding line 1110f penetrates through the upper ground 1110g may overlap one edge line of the lower patch 1110 or be arranged inside the edge line. As an example, the ground via G-via may be arranged in all of a central region, a left region, and a right region with respect to each of three edge regions other than a region in which an edge line is provided, among the four edge regions.

In a first edge region in which an edge line is provided, the ground via G-via may be arranged in a left region and a right region with reference to a region in which the feeding line 1110f is connected to the lower patch 1110. In relation to this, a region in which the feeding line 1110f penetrates through the upper ground 1110g may overlap an edge line or be arranged inside the edge line. When the region in which the feeding lie 1110f penetrates through the upper ground 110g is arranged inside the edge line, configuration may be provided such that a ground via is not arranged in a central region other than an edge region of the lower patch 1110.

In relation to a stack-type patch structure described herein, sizes, shapes, and arrangement structures of a lower patch and an upper patch may be variously changed. In relation to this, FIG. 12 illustrate sizes. shapes, and arrangement structures of a lower patch and an upper patch in a stack-type patch structure according to various embodiments.

Figure 12:
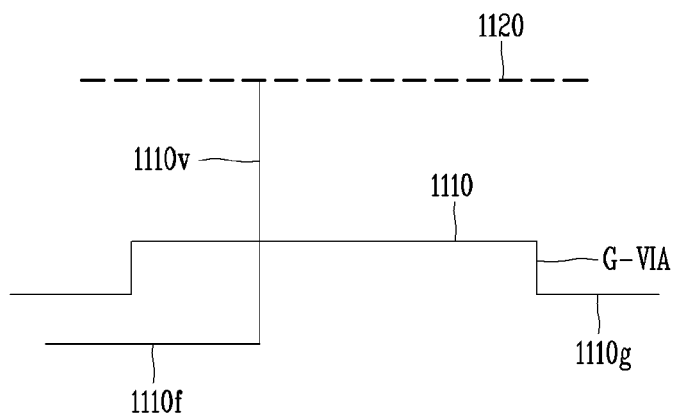
FIG. 12 illustrate a size. a shape, and an arrangement structure of a lower patch and an upper patch in a stack-type patch structure according to various embodiments.
Figure 12:
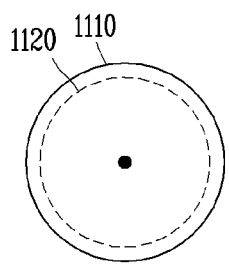
Figure 12:
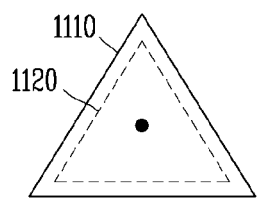
Figure 12:
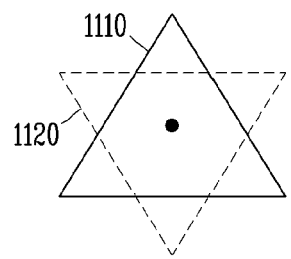
Figure 12:
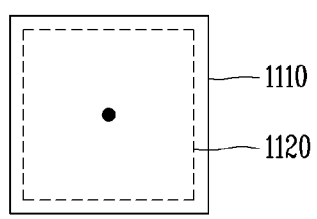
Figure 12:
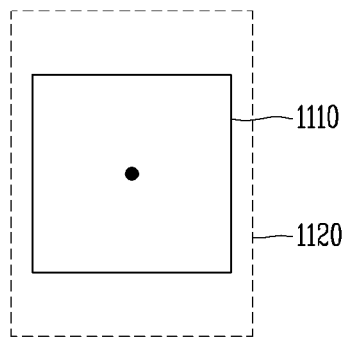
Figure 12:
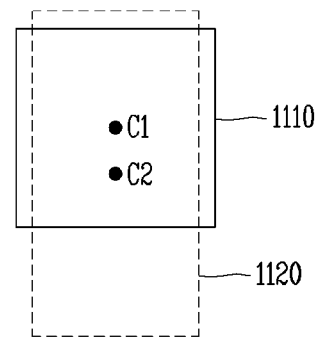

Referring to FIGS. 5A to 7 and (a) of FIG. 12, the lower patch 1110 and the upper patch 1120 may be provided to have a circular shape, and a size of the upper patch 1120 may be provided to be smaller than that of the lower patch 1110. Referring to (b) of FIG. 12, the lower patch 1110 and the upper patch 1120 are provided to have a triangular shape, and a size of the upper patch 1120 may be provided to be smaller than that of the lower patch 1110. Referring to (c) of FIG. 12, the lower patch 1110 may be provided to have a triangular shape, and the upper patch 1120 may be provided to have an inverted triangular shape.

In relation to this, a size of the upper patch 1120 may be provided to be smaller than that of the lower patch 1110, and an edge region in which the ground via G-via is connected to the lower patch 1110 may be an internal region of the upper patch 1120. Accordingly, a change in antenna characteristics according to a stepped ground structure due to the ground via G-via may affect mainly the internal region of the upper patch 1120. Alternatively, an edge region in which the ground via G-via is connected to the lower patch 1110 may be an external region of the upper patch 1120. Accordingly, the stepped ground structure due to the ground via G-via may also affect a fringing field provided at an outer boundary of the upper patch 1120.

As illustrated in the drawing, the feeding line 1110f may penetrate through the lower patch 1110 to be connected to the upper patch 1120. Alternatively, the feeding line 1110f may be connected to the feeding pad 1110p arranged between the lower patch 1110 and the upper patch 1120.

Referring to FIGS. 5A to 7 and (d) of FIG. 12, the lower patch 1110 and the upper patch 1120 may be provided to have a rectangular shape, and a size of the upper patch 1120 may be provided to be smaller than that of the lower patch 1110. Referring to (e) of FIG. 12, the lower patch 1110 and the upper patch 1120 may be provided to have a rectangular shape, and a size of one side of the upper patch 1120 may be provided to be greater than a size of one side of the lower patch 1110.

A first center point C1 of the lower patch 1110 may be spaced apart from a second center point C2 of the upper patch 1120. In a region between the first center point C1 and the second center point C2, the lower patch 1110 may be connected to a region of the upper ground 1110g through at least one ground via. Accordingly, even when the second center point C2 of the upper patch 1120 is very adjacent to or overlaps an edge region of the lower patch 1110, a stepped ground structure may be provided using the lower patch 1110.

Figure 13A:
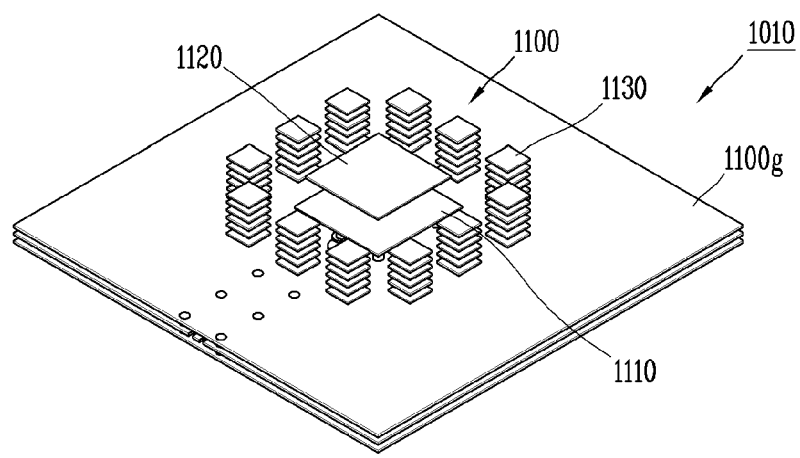
FIGS. 13A to 13C illustrate a perspective view and a side view of an antenna module having a graded ground layer according to the present disclosure, and a side view of an antenna module configured as an array antenna, respectively.
Figure 13B:
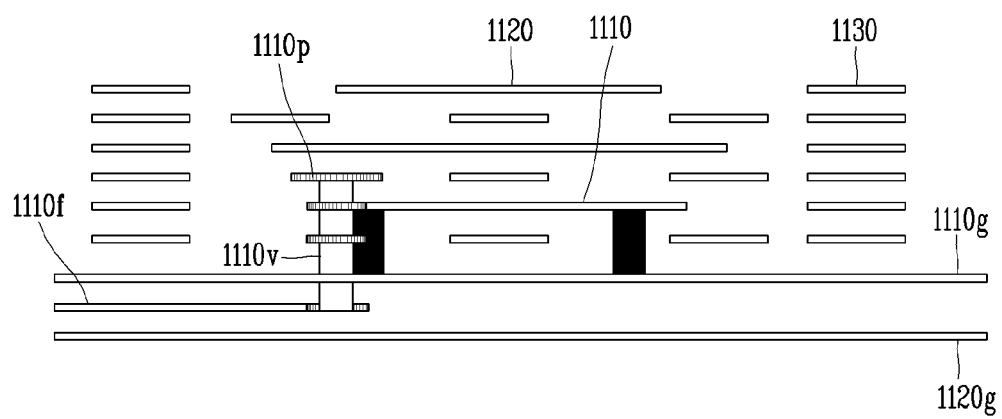
Figure 13C:
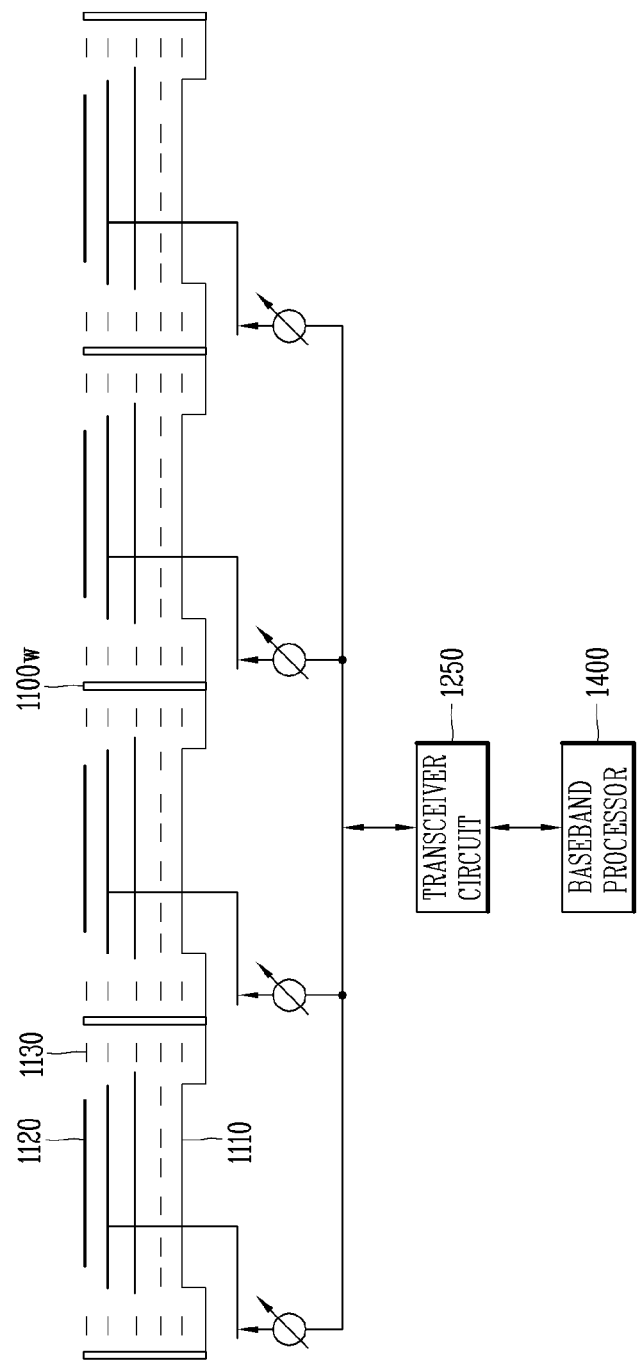

An antenna having the stepped ground structure described herein may be configured as an array antenna. In addition, a dummy pattern may be provided in a periphery of each of antenna elements having the stepped ground structure. In relation to this, FIGS. 13A to 13C illustrate a perspective view and a side view of an antenna module having a graded ground layer according to the present disclosure, and a side view of an antenna module configured as an array antenna, respectively. FIGS. 13A and 13B illustrate a perspective view and a side view of an antenna module having a stepped ground structure described herein, respectively. FIG. 13C illustrate a side view of an antenna module configured as an array antenna having a stepped ground structure described herein.

FIG. 13A illustrates a structure in which dummy patterns 1130 are arranged in a stack-type patch structure including the lower patch 1110 and the upper patch 1120. As illustrated in FIG. 13C, the antenna 1100 may be configured as an array antenna including a plurality of antenna elements. As illustrated in FIGS. 13A and 13C, the dummy patterns 1130 on different layers may be provided between the antenna elements constituting the array antenna. Accordingly, the antenna 1100 may further include the dummy patterns 1130 in addition to the lower patch 1110 and the upper patch 1120.

Referring to FIG. 13A, the dummy patterns 1130 may be provided to surround the lower patch 1110 and the upper patch 1120. FIG. 13B is a side view of the antenna 1100 for illustrating a section of the antenna 1100 provided to include the lower patch 1110, the upper patch 1120, and the dummy patterns 1130. As an example, FIG. 13 may be a side view of the antenna 1100 for illustrating a section provided along center lines of the lower patch 1110 and the upper patch 1120.

Referring to FIG. 13B, the dummy patterns 1130 may be also arranged on a layer between the lower patch 1110 and the upper patch 1120. Accordingly, as the antenna 1100 resonates through the lower patch 1110, the upper patch, and the dummy patterns 1130 in a stack type patch structure in which coupling may be performed, an antenna bandwidth may be expanded. The dummy patterns 1130 fill a space of each layer in which a conductor is not present, to prevent deformation of or a thickness decrease in a PCB such as a multilayer substrate due to external pressure, shock, a manufacture process, or the like.

FIG. 13C illustrates an array antenna in which respective antenna elements are provided to include the lower patch 1110, the upper patch 1120, and the dummy patterns 1130. The antenna 1100 implemented to be an array antenna may be implemented as a plurality of antenna elements. Each of the antenna elements may be provided to include the lower patch 1110, the upper patch 1120, and the dummy patterns 1130. Meanwhile, a ground wall 1100w may be provided between adjacent antenna elements to reduce a level of interference between the antenna elements. In relation to this, a surface wave interference between adjacent antenna elements may be reduced by the ground wall 1100w.

The electronic device described herein may be configured to include the antenna 1100 configured as an array antenna, the transceiver circuitry 1250, and the processor 1400. The transceiver circuitry 1250 may be arranged on a multilayer substrate and configured to transmit a signal to the antenna 1100 and receive a signal from the antenna 1100. As an example, the transceiver circuitry 1250 corresponding to an RFIC may be arranged on a rear surface of a multilayer substrate and the antenna 1100 may be arranged on a front surface of the multilayer substrate, but are not limited thereto.

The processor 1400 may be coupled to be operable with the transceiver circuitry 1250 and configured to control the transceiver circuitry 1250. In relation to this, the processor 1400 may be a baseband processor such as a modem. However, the processor 1400 is not limited thereto, and may be an arbitrary processor configured to control the transceiver circuitry 1250. The processor 1400 may control the transceiver circuitry 1250 to perform beamforming by applying a phase variable signal to each antenna element through the feeding line 1110f. In relation to this, a phase shifter may be coupled to each antenna element, and the processor 1400 may radiate a signal beam-formed through an array antenna by controlling the phase shifter through the transceiver circuitry 1250.

Figure 14A:
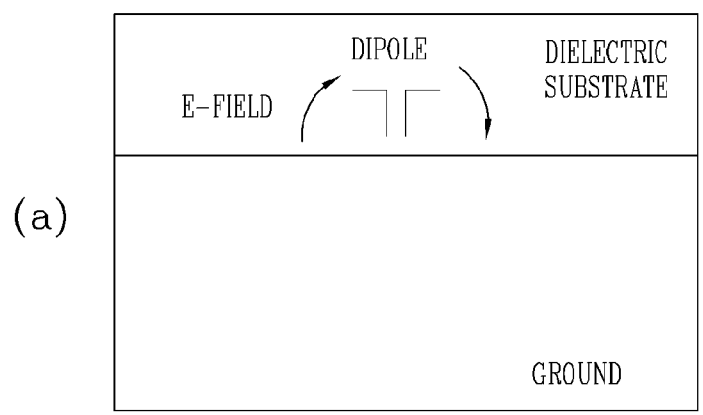
FIG. 14A illustrates an end-fire antenna element and a ground shape both arranged in a radiation region of a multilayer substrate according to an embodiment.
Figure 14A:
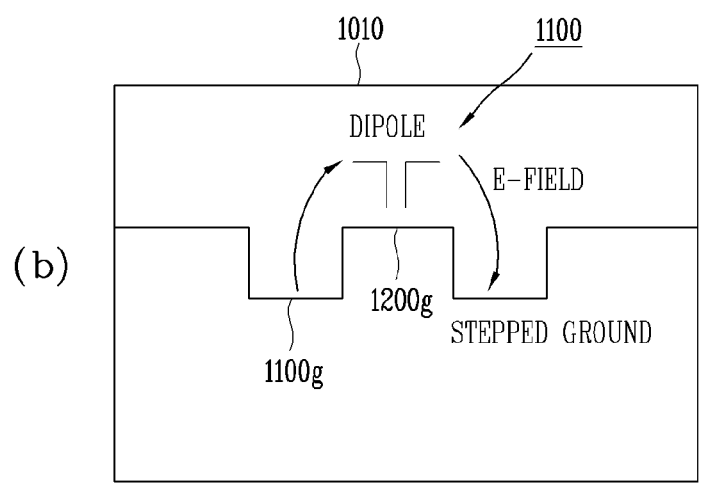
Figure 14B:
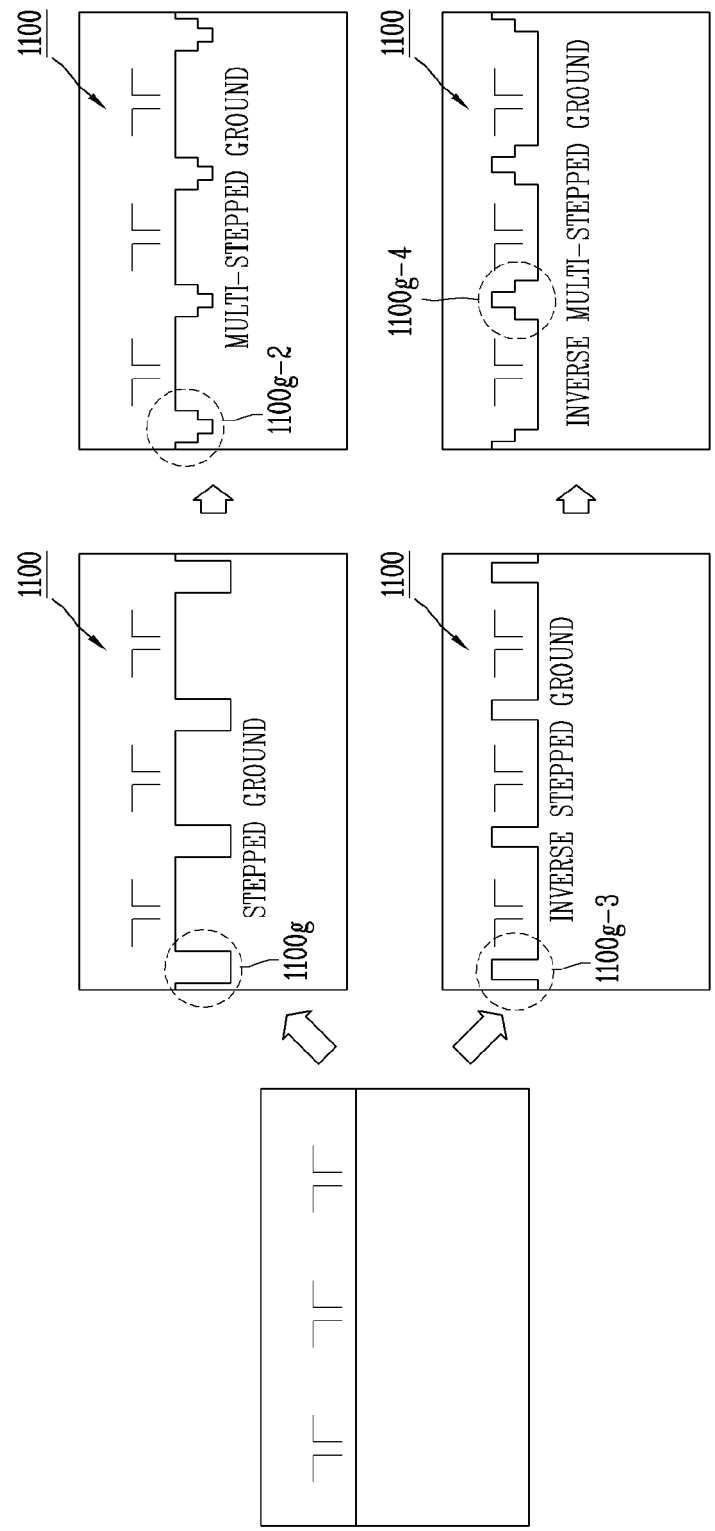
FIG. 14B illustrates an end-fire array antenna and a ground shape both arranged in a radiation region of a multilayer substrate according to an embodiment.

The antenna element described herein is not limited to an antenna element having a same broadside radiation pattern as that of a patch antenna, but implemented as various forms of antenna element. As an example, the antenna element described herein may be an antenna element having a same end-fire radiation pattern as that of a dipole antenna. In relation to this, FIG. 14A illustrates an end-fire antenna element and a ground shape both arranged in a radiation region of a multilayer substrate according to an embodiment. FIG. 14B illustrates an end-fire array antenna and a ground shape both arranged in a radiation region of a multilayer substrate according to an embodiment.

Referring to FIG. 14A, the antenna 1100 may be provided any one layer of the multilayer substrate 1010. In relation to this, the antenna 100 may be provided as a dipole element. Meanwhile, the antenna 1100 may be configured as an end-fire element having an end-fire radiation pattern like a dipole element. In relation to this, a ground area 1100g in a region adjacent to an end portion of a dipole element may be provided as a stepped ground. As an example, a ground region 1100g may be provided as a stepped ground in which a ground pattern is removed in correspondence with a predetermined length and a predetermined width compared to the ground region 1200g adjacent to a center portion of the dipole element.

Referring to (b) of FIG. 14A, an effective length of an electric field in which radiation is performed at an end portion of a dipole element through the ground region 1100g configured as a stepped ground is increased compared to an effective length of an electric field according to the ground structure of (a) of FIG. 14A. Accordingly, radiation efficiency of a dipole antenna having a structure of the stepped ground of (b) of FIG. 14A is increased compared to radiation efficiency of a dipole antenna having the ground structure of (a) of FIG. 14A.

The dipole element may be implemented as one conductive pattern or a plurality of stacked conductive patterns. When the dipole element is implemented as the stacked conductive patterns, a conductive pattern in an upper portion may be referred as an upper antenna element, and a conductive pattern in a lower portion may be referred as a lower antenna element. The upper antenna element and the lower antenna element may be referred to as an upper patch and a lower patch, respectively. Alternatively, the upper antenna element and the lower antenna element may be referred to as a first patch and a second patch, respectively.

Referring to FIG. 14B, the antenna 1100 may be configured as an array antenna including a plurality of dipole elements. In relation to this, the ground area 1100g in a region adjacent to an end portion of each of the dipole elements may be provided as a stepped ground. As an example, the ground region 1100g may be provided as a stepped ground in which a ground pattern is removed in correspondence with a predetermined length and a predetermined width compared to the ground region 1200g adjacent to a center portion of each of the dipole elements constituting an array antenna.

A ground region 1100g-2 may be provided to have a stepped ground structure having three or more steps as illustrated in FIG. 14B. Alternatively, a ground region 1100g-3 may be provided to have an inverse stepped ground structure as illustrated in FIG. 14B. Alternatively, a ground region 1100g-4 may be provided to have an inverse stepped ground structure according to steps as illustrated in FIG. 14B.

An electronic device including an antenna having a stepped ground structure implemented on a multilayer structure according to an aspect of the present disclosure has been described above. Hereinafter, an antenna module having a stepped ground structure implemented on a multilayer structure according to another aspect of the present disclosure will be described. In relation to this, the description provided with reference to FIGS. 1 to 14B may be applied to an antenna module that is to be described hereinafter.

In relation to this, referring to FIGS. 1 to 14B, the antenna module 1100 including the multilayer substrate 1010 according to the present disclosure is provided. The antenna module 1100 may include the lower patch 1110 and the upper patch 1120.

The lower patch 1110 may be arranged on a layer other than that of an upper ground, among a plurality of ground layers of the multilayer substrate 1010 including a front layer, a back layer, and a plurality of middle layers. The lower patch 1110 may be electrically connected to the upper ground 1110g at a plurality of offset points.

The upper patch 1120 may be configured to be arranged apart from the lower patch 1110 by a predetermined space. In relation to this, at a plurality of offset points offset from a center point of the lower patch, the lower patch 1110 may be electrically connected to the upper ground 1120 through the ground via G-via. As an example, the lower patch 1110 may be electrically connected to the upper ground 1120 in a first axis direction and a second axis direction vertical to the first axis direction.

Hereinafter, electrical characteristics of the antenna 1100 implemented on a multilayer substrate and having a stepped ground structure described herein are compared to those of an antenna having a general ground structure. In relation to this, in the antenna 1100 having the lower patch 1100 and the upper patch 1120 both illustrated in FIGS. 6A to 6C, the lower patch 1110 and the upper ground 1110g may be connected to each other through the ground via G-via. The antenna 1100 having a stepped ground structure has broadband operation and high efficiency radiation characteristics compared to the antenna having a general ground structure. In relation to this, FIGS. 15A to 15C illustrates comparison between an antenna having a stepped ground structure and an antenna having a general ground structure with respect to reflection loss characteristics, peak gain characteristics, and a radiation pattern of a single element.

Figure 15A:
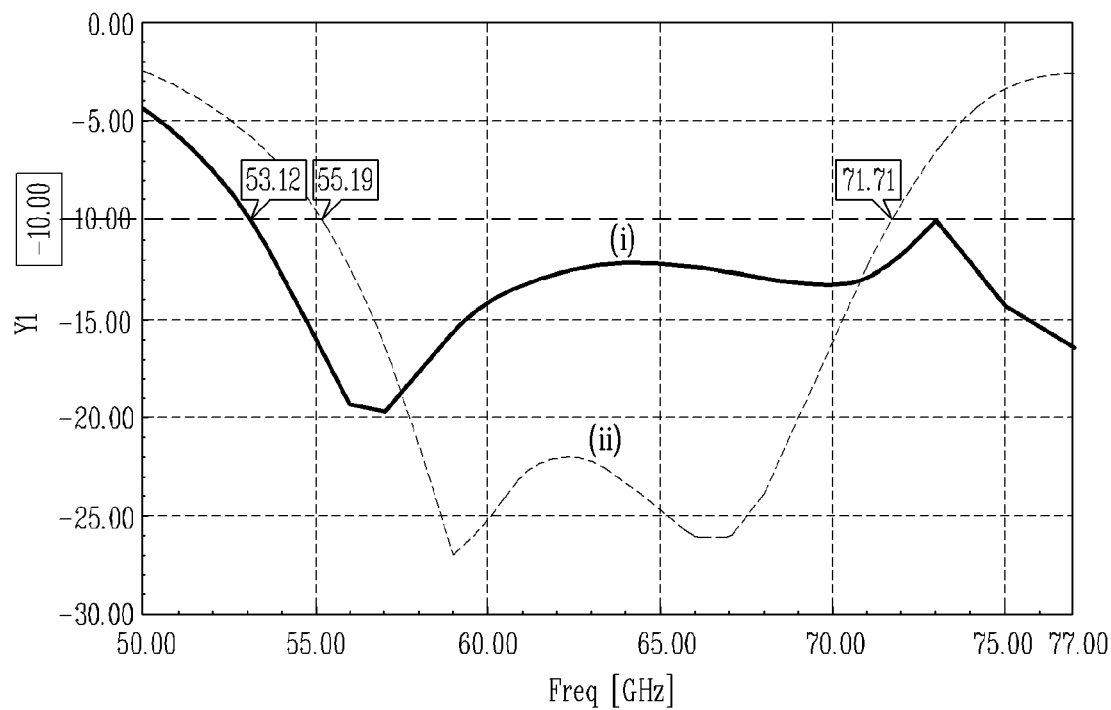
FIGS. 15A to 15C illustrate a comparison of reflection loss characteristics and peak gain characteristics, and a radiation pattern of a single element between an antenna having a graded ground structure and an antenna having a general ground structure.

FIG. 15A illustrates return loss characteristics of an antenna having a stepped ground structure and an antenna having a general ground structure. FIG. 15B illustrates peak gain characteristics of an antenna having a stepped ground structure and an antenna having a general ground structure. FIG. 15C illustrates radiation pattern characteristics of an antenna having a stepped ground structure with respect to a particular frequency.

Referring to FIG. 15A, reflection loss characteristics of the antenna having a stepped ground structure has a value equal to or less than −10 dB in a band of 53.1 GHz to 77 GHz as indicated by (i) with reference to return loss. That is, a bandwidth of 10 dB with reference to return loss has bandwidth characteristics of 53.1 GHz to 77 GHz. On the other hand, as indicates by (ii), a reflection loss bandwidth of the antenna having a general ground structure is decreased compared to a reflection loss bandwidth of the antenna having a stepped ground structure.

Figure 15B:
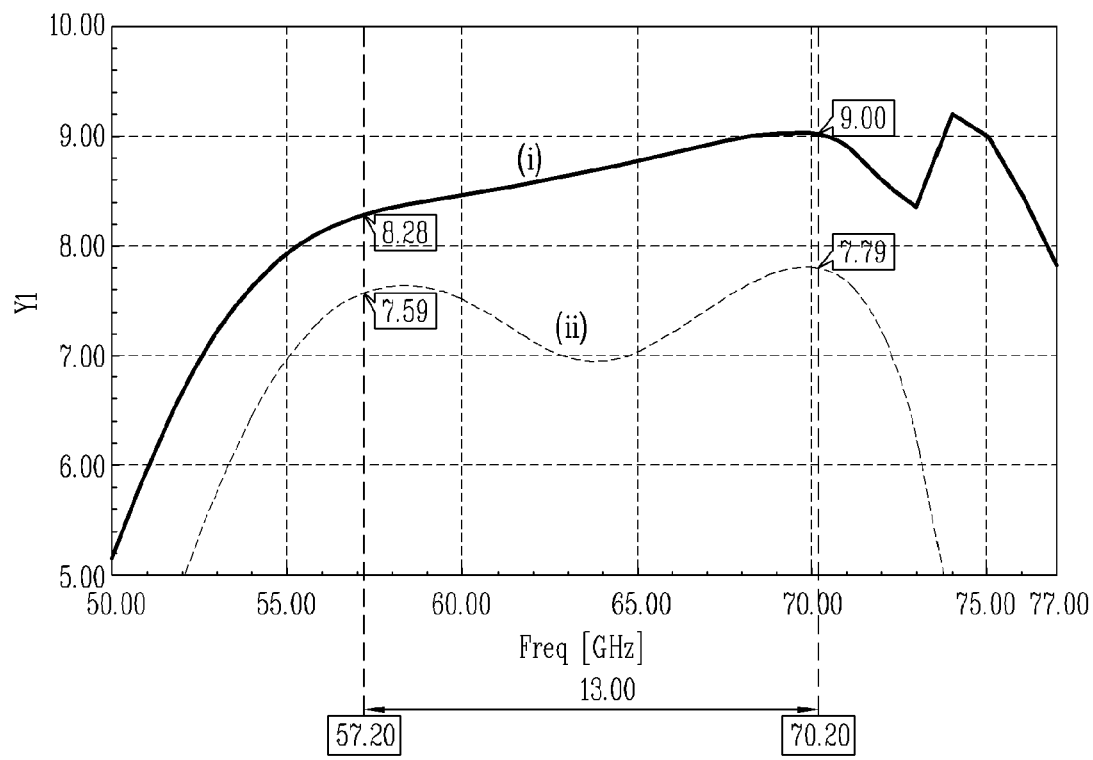
Figure 15C:
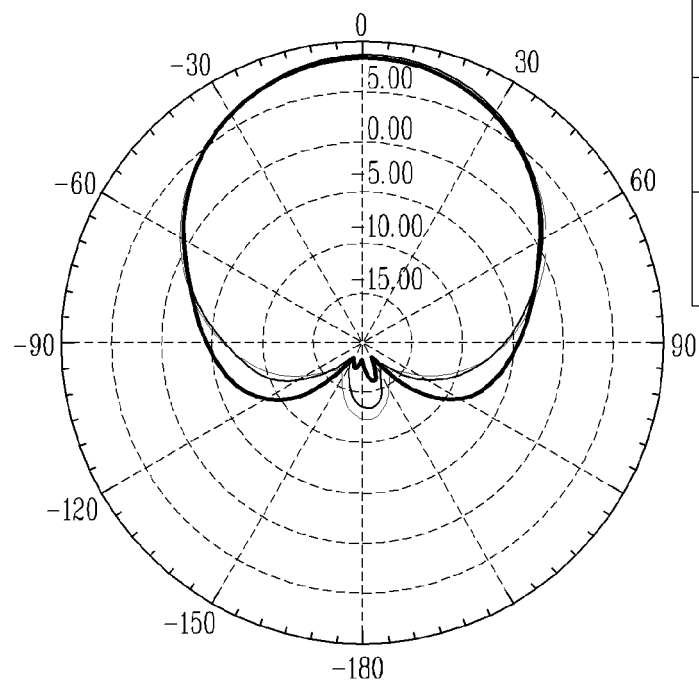

Referring to FIG. 15B, peak gain characteristics of the antenna having a stepped ground structure has a value ranging from 8.2 dBi to 9.0 dBi. On the other hand, peak gain characteristics of the antenna having a general ground structure has a value ranging from 7.6 dBi to 7.8 dBi. Accordingly, the antenna having a stepped ground structure described herein may change a ground height in each region of a lower patch to optimize antenna efficiency. As an example, antenna efficiency may be optimized by changing a ground height in an edge region of a lower patch. In relation to this, a ground height in each region may be changed to relieve deterioration in antenna radiation efficiency according to a surface wave between respective antenna elements.

FIG. 15C illustrates an antenna radiation pattern at different frequencies, i.e., lowest, middle, and highest frequencies (e.g., 57 GHz, 63 GHz, and 70 GHz). Referring to FIG. 15C, it may be understood that a radiation pattern is constantly maintained without distortion according to a frequency change. Referring to FIG. 15C, a beam radiated in a rear direction is maintained to be less than a predetermined level, and distortion such as an asymmetrical shape does not occur in an antenna beam pattern. This is because deterioration in antenna radiation efficiency according to a surface wave between respective antenna elements is relieved by changing a ground height in an edge region of a lower patch.

Figure 16A:
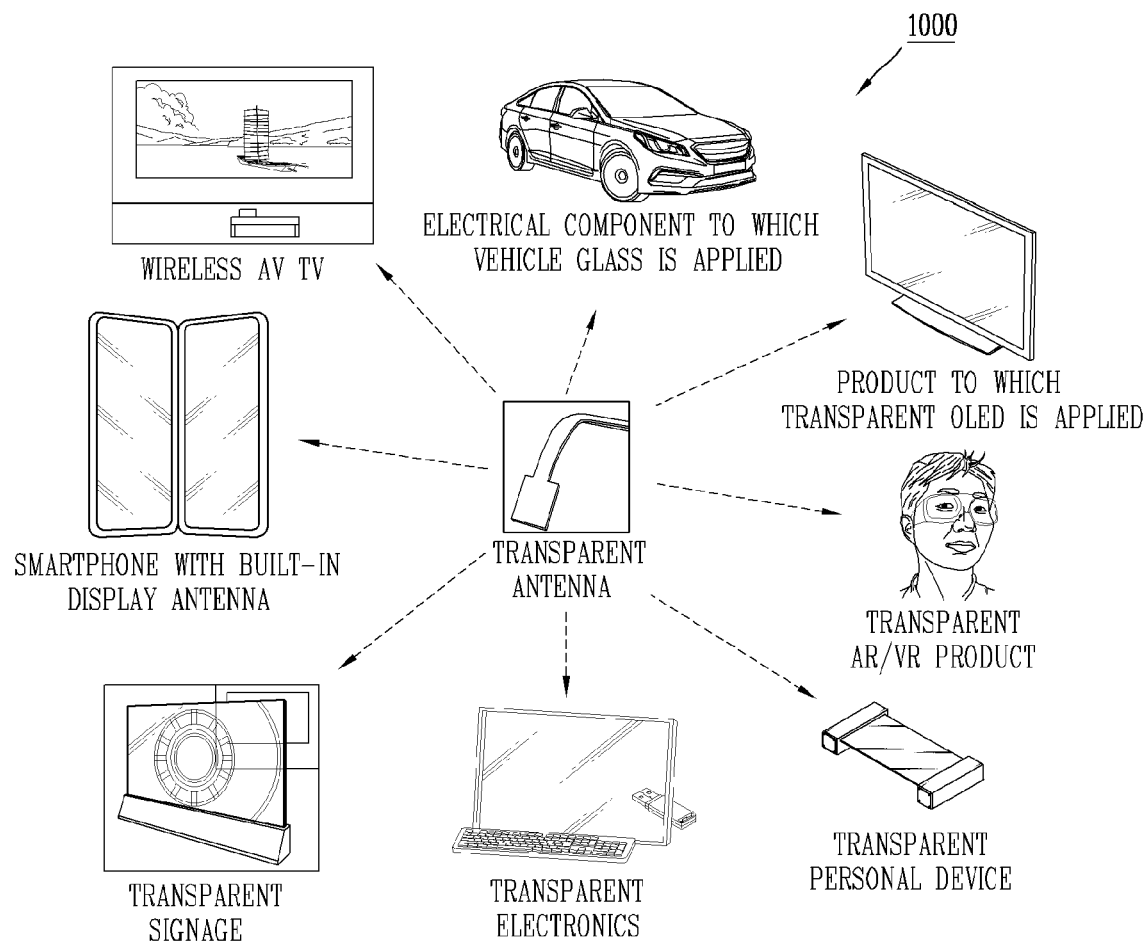
FIG. 16A illustrates an example in which a mmWave antenna module provided in the present disclosure is applied to various electronic devices.

A mmWave antenna module described herein may be applied to various electronic devices. In relation to this, FIG. 16A illustrates an example in which a mmWave antenna module described herein is applied to various electronic devices. Referring to FIGS. 1 to 16A, the electronic device 1000 may be at least one from among a mobile terminal, a signage, a display device, a transparent augmented reality (AR)/virtual reality (VR) device, and a vehicle or wireless audio/video apparatus. In relation to this, the antenna 1100 having a graded ground structure operating in a mmWave band described herein may be arranged in an electronic device, or a part of the antenna 1100 may be implemented as a transparent antenna of a display.

Figure 16B:
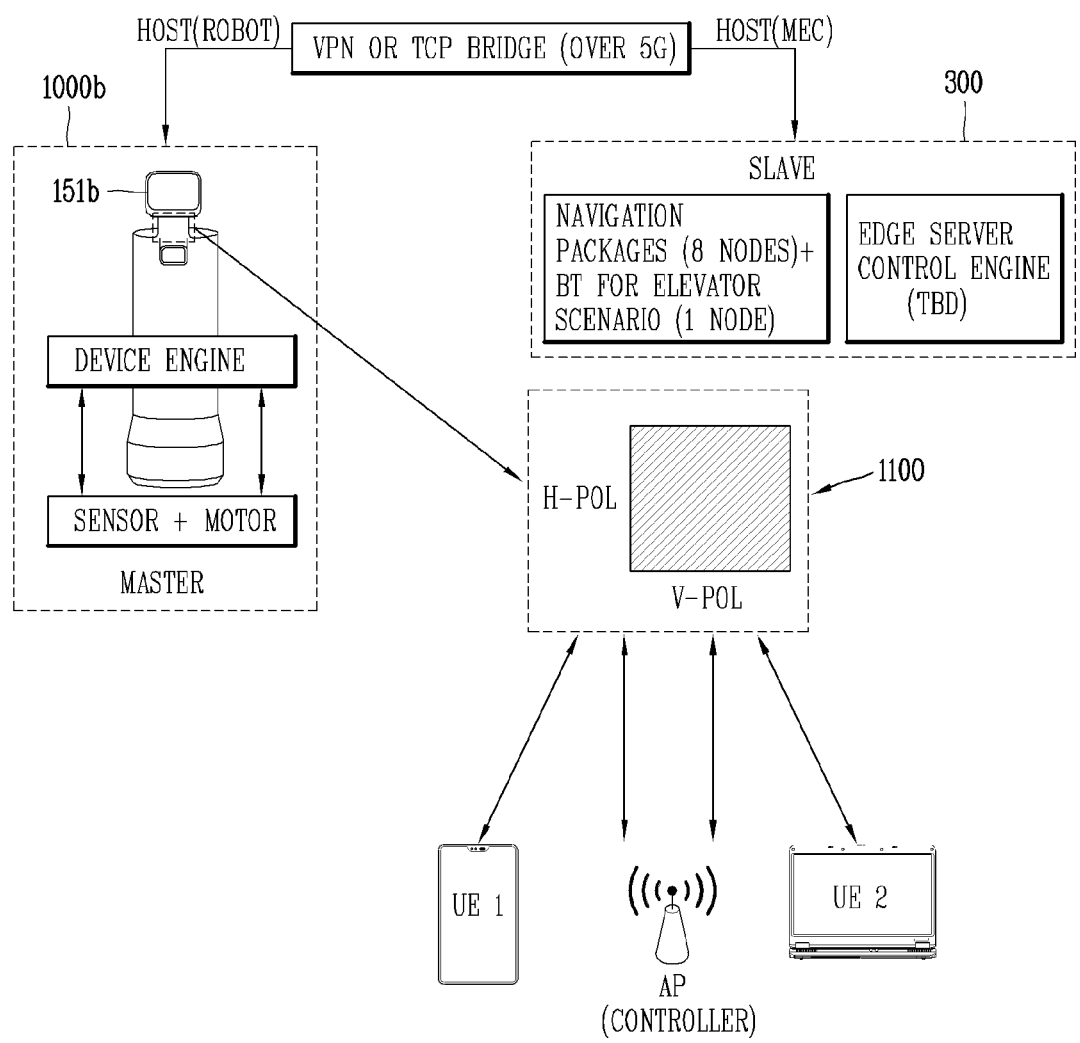
FIG. 16B illustrates an example in which an antenna having a graded ground structure operating in a mmWave band provided in the present disclosure is applied to a robot.

FIG. 16B illustrates an example in which the antenna 1100 having a graded ground structure operating in a mmWave band described herein is applied to a robot. Referring to FIGS. 3A to 16B, the antenna 1100, i.e., an antenna module may be arranged below a display of a robot 1000b. The antenna module 1100 may operate in a 5G mmWave band. The robot 1000b may transmit or receive large-capacity wireless data at a high speed with a peripheral electronic device, an AP, a base station using the antenna module 1100. The antenna 1100 having a stepped ground structure may support MIMO operation through a single array antenna module configured to support double polarizations. In this case, the double polarizations may include a vertical polarization and a horizontal polarization. However, the double polarizations are not limited thereto, and may include any polarizations substantially perpendicular to each other. In addition, the MIMO operation may be supported using different array antenna modules arranged in different positions in the robot 1000b.

The robot 1000b may interoperate with a server 300 via a communication network under control by a controller such as a device engine. In this case, the communication network may be a 5G communication network. The communication network may be implemented as a virtual private network (VPN) or a transmission control protocol (TCP) bridge. The robot 1000b may be connected to the server, i.e., a MEC server 300 via the communication network. Since the robot 1000b interoperates with the MEC server 300, such a robot/network system may be referred to as a cloud robotics system. The cloud robotics system is a system configured to process functions needed for the robot 1000b to perform a given task in a cloud server such as the MEC server 300.

A multi-mode/multi-band antenna according to the present disclosure and an electronic device configured to control the same have been described above. Hereinafter, a wireless communication system including a multi-mode/multi-band antenna, an electronic device configured to control the same, and a base station will be described. In this regard, FIG. 17 illustrates a block diagram of a wireless communication system that is applicable to methods proposed herein.

Figure 17:
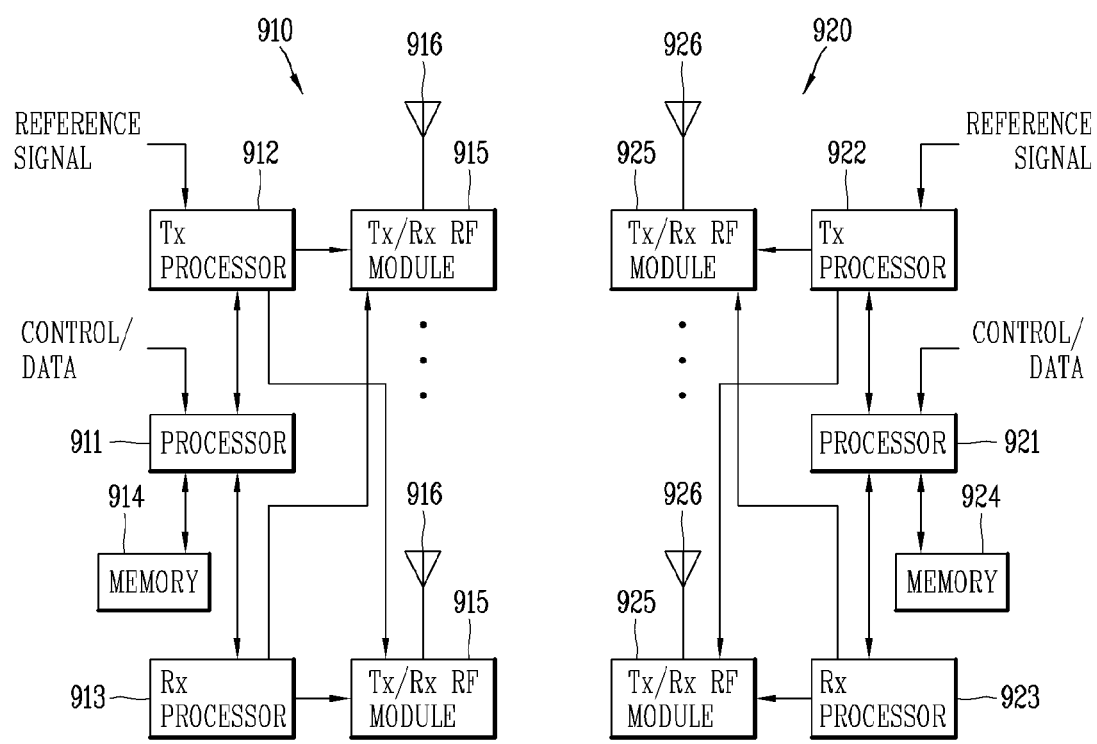
FIG. 17 is a block diagram of a wireless communication system to which methods proposed in the present disclosure are applicable.

Referring to FIG. 17, the wireless communication system may include a first communication device 910 and/or a second communication device 920. The terms 'A and/or B' may be interpreted as having the same meaning as 'including at least one of A or B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper (high-level) layer packet from a core network may be provided to the processor 911. The processor may implement the function of an L2 layer. In DL, the processor may provide multiplexing between a logical channel and a transport channel and radio resource allocation to the second communication device 920, and may be in charge of signaling to the second communication device. The Tx processor 912 may implement various signal processing functions for an L1 layer (i.e., a physical layer). The signal processing function may facilitate forward error correction (FEC) in the second communication device, and include coding and interleaving. An encoded and modulated symbol may be divided into parallel streams. Each stream may be mapped to an OFDM subcarrier wave, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication device may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication device. When a plurality of spatial streams are destined for the second communication device, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted over the physical channel by the first communication device. The corresponding data and control signal may then be provided to the processor 921.

UL (communication from the second communication device to the first communication device) may be processed in the first communication device 910 in a similar manner to that described with respect to the receiver function in the second communication device 920. The Tx/Rx modules 925 may receive signals via the antennas 926, respectively. The Tx/Rx modules may provide RF carriers and information to the RX processor 923, respectively. The processor 921 may operate in conjunction with the memory 924 in which a program code and data are stored. The memory may be referred to as a computer-readable medium.

An antenna module having a stepped ground structure implemented on a multilayer substrate according to the present disclosure, and an electronic device including the antenna module have been described above. Hereinafter, technical effects of an antenna module having a stepped ground structure implemented on a multilayer substrate and an electronic device including the same will be described.

According to at least one embodiment, antenna bandwidth characteristics may be enhanced using a stepped ground structure in a mmWave band.

According to at least one embodiment, antenna radiation efficiency may be increased and communication coverage may be expanded using a stepped ground structure in a mmWave band.

According to at least one embodiment, a distance between an upper patch and a ground is increased due to a stepped ground, and thus, a surface wave may be reduced and antenna efficiency may be enhanced. Accordingly, when an antenna having a stepped ground structure is implemented as an array antenna, a side-lobe level may be reduced.

According to at least one embodiment, antenna radiation efficiency may be increased and a feeding loss may be reduced due to a stepped structure an optimized feeding structure.

According to at least one embodiment, antenna characteristics may be enhanced in an array antenna structure by applying a stepped structure an optimized feeding structure to each radiation element of an array antenna.

Further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the aforementioned present disclosure, the design of the antenna module having the multi-stepped ground structure and a control method thereof can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An electronic device having a multilayer substrate, the electronic device comprising:
   an antenna; and
   the multilayer substrate on which the antenna is disposed and which comprises a front layer, a back layer, a plurality of middle layers, and a plurality of ground layers,
   wherein the antenna comprises:
   a lower patch that is disposed on a layer different from an upper ground among the plurality of ground layers and is electrically connected to the upper ground at a plurality of offset points;
   an upper patch disposed spaced apart from the lower patch; and
   a ground via configured to connect the lower patch and the upper ground at the plurality of offset points offset from a center point of the lower patch, wherein an edge portion of the lower patch is connected with the upper ground and the lower patch and the upper ground are formed graded ground layers by the ground via.

2. The electronic device of claim 1, wherein a second height from the upper patch to the upper ground at the edge portion of the lower patch is increased than a first height from the upper patch to the lower patch to provide the graded ground layers.

3. The electronic device of claim 1, wherein at the plurality of offset points offset at the center point of the lower patch, the lower patch is electrically connected to the upper ground through the ground via in a first axis direction.

4. The electronic device of claim 1, wherein at the plurality of offset points offset at the center point of the lower patch, the lower patch is electrically connected to the upper ground through the ground via in a first axis direction and a second axis direction vertical to the first axis direction.

5. The electronic device of claim 4, wherein the lower patch and the upper ground are connected to each other through a plurality of ground vias arranged in the edge portion of the lower patch, and
a number of the plurality of grounds vias is three or more, and the plurality of ground vias are arranged in a triangular or rectangular arrangement structure.

6. The electronic device of claim 1, wherein the multilayer substrate comprises a feeding line arranged between the upper ground and a lower ground, and
the feeding line penetrates through the upper ground to be electrically connected to the lower patch, and a ground area is removed from a region in which the feeding line penetrates through the upper ground.

7. The electronic device of claim 6, wherein the feeding line penetrates through the lower patch to be electrically connected to a feeding pad arranged on a layer between the lower patch and the upper patch.

8. The electronic device of claim 6, wherein the feeding line penetrates through the lower patch to be electrically connected to the upper patch, and
the lower patch is connected to the lower ground through the ground via.

9. The electronic device of claim 6, wherein the antenna further comprises a second lower patch arranged on the lower patch and electrically connected to the lower patch at a plurality of offset points, and
the feeding line penetrates through the lower patch and the second lower patch to be electrically connected to a feeding pad disposed on a layer between the second lower patch and the upper patch or electrically connected to the upper patch.

10. The electronic device of claim 6, wherein the lower patch is disposed on an underlying layer below the upper ground, and
the feeding line penetrates through the lower patch disposed on the underlying layer to be electrically connected to the upper patch.

11. The electronic device of claim 6, wherein with respect to the lower patch, two lower patches are disposed on an underlying layer below the upper ground to partially overlap two edge regions of the upper patch,
the antenna further comprises a second lower patch disposed on a same layer as that of the upper ground, and one end of the lower patch is connected to the upper ground through a first ground via, and another end of the lower patch is connected to the second lower patch via a second ground via.

12. The electronic device of claim 11, wherein the feeding line comprises:
a first feeding line disposed between the upper ground and the lower ground; and
a second feeding line connected to the first feeding line through a vertical via and disposed on a layer below the first feeding line, and
the second feeding line provides a partial graded ground region in a region including a region in which the first ground via and the second ground via are provided.

13. The electronic device of claim 6, wherein a size of the upper patch is smaller than a size of the lower patch,
an edge region in which the ground via is connected to the lower patch is an internal region of the upper patch, and
the feeding line penetrates through the lower patch to be electrically connected to the upper patch or a feeding pad arranged between the lower patch and the upper patch.

14. The electronic device of claim 6, wherein a first center point of the lower patch is spaced apart from a second center point of the upper patch, and
the lower patch is connected to a region of the upper ground through at least one ground via in a region between the first center point and the second center point.

15. The electronic device of claim 6, wherein the antenna is configured as an array antenna including a plurality of antenna elements, and
further comprises dummy patterns provided on different layers to be arranged between the plurality of antenna elements constituting the array antenna, respectively, and
the dummy patterns are provided to surround the lower patch and the upper patch.

16. The electronic device of claim 15, further comprising a transceiver circuitry arranged on the multilayer substrate and configured to transmit a signal to the antenna and receive a signal from the antenna; and
a processor coupled to be operable with the transceiver circuitry and configured to control the transceiver circuitry,
wherein the processor controls the transceiver circuitry to perform beamforming by applying a phase variable signal to each of the plurality of antenna elements through the feeding line.

17. The electronic device of claim 1, wherein the multilayer substrate comprises a feeding line arranged between the upper ground and a lower ground, and
the feeding line penetrates through the lower patch corresponding to a region in which the lower patch is not disposed, to be electrically connected to a feeding pad arranged on a layer between the lower patch and the upper patch.

18. The electronic device of claim 17, wherein the feeding line is electrically connected to the feeding pad through a vertical via at a point apart from a center of the feeding pad by a predetermined distance.

19. The electronic device of claim 17, wherein the feeding line connected to the feeding pad at a first point through a first vertical via is connected to the upper patch at a second point through a second vertical via, and
the lower patch is connected to the lower ground through the ground via.

20. The electronic device of claim 1, wherein the multilayer substrate comprises a feeding line arranged between the upper ground and a lower ground, the feeding line penetrates through the lower ground corresponding to a region in which the lower patch is not disposed, and the ground via connected to the upper ground is disposed on all four edge regions of the lower patch.

21. The electronic device of claim 20, wherein the ground via is disposed in all of a central region, a left region, and a right region with respect to each of the four edge regions.

22. The electronic device of claim 20, wherein the region in which the feeding line penetrates through the upper ground overlaps one edge line of the lower patch or disposed inside the edge line, and the ground via is disposed in all of a central region, a left region, and a right region with respect to each of three edge regions among the four edge regions, other than a region in which the edge line is provided.

23. The electronic device of claim 22, wherein in a first edge region in which the edge line is provided, the ground via is disposed in a left region and a right region with respect to a region in which the feeding line is connected to the lower patch.

24. The electronic device of claim 22, wherein the region in which the feeding line penetrates through the upper ground is disposed inside the edge line, and the ground via is not disposed in the center point of the lower patch other than an edge region of the lower patch.

25. The electronic device of claim 1, wherein the antenna is configured as an array antenna including a plurality of dipole elements, and a ground region in a region adjacent to an end portion of the plurality of dipole elements is provided as a graded ground in which a ground pattern is removed in correspondence with a predetermined length and a predetermined width compared to a ground region adjacent to a center portion of the plurality of dipole elements.

26. An antenna module implemented as a multilayer substrate, the antenna module comprising:

a lower patch disposed on a layer different from that of an upper ground, among a plurality of ground layers of the multilayer substrate including a front layer, a back layer, and a plurality of middle layers, and electrically connected to the upper ground at a plurality of offset points;

an upper patch disposed spaced apart from the lower patch; and a ground via configured to connect the lower patch and the upper ground at the plurality of offset points offset from a center point of the lower patch, wherein an edge portion of the lower patch is electrically connected to the upper ground through the ground via in a first axis direction and a second axis direction vertical to the first axis direction, and the lower patch and the upper ground are formed graded ground layers by the ground via.

* * * * *